US008543166B2

(12) United States Patent
Choi et al.

(10) Patent No.: US 8,543,166 B2
(45) Date of Patent: Sep. 24, 2013

(54) MOBILE TERMINAL EQUIPPED WITH FLEXIBLE DISPLAY AND CONTROLLING METHOD THEREOF

(75) Inventors: Kil Soo Choi, Seoul (KR); Sang Won Jung, Seoul (KR); Dae Hyun Baek, Seoul (KR); Kyung Ju Lee, Seoul (KR); Byung Ean Bong, Seoul (KR); Kyung Jin Seo, Seoul (KR); Kwang Suh Jung, Seoul (KR); Yeong Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 606 days.

(21) Appl. No.: 12/510,942

(22) Filed: Jul. 28, 2009

(65) Prior Publication Data
US 2010/0056223 A1    Mar. 4, 2010

(30) Foreign Application Priority Data

Sep. 2, 2008    (KR) .................. 10-2008-0086441

(51) Int. Cl.
  H04M 1/00      (2006.01)
  G06F 3/045     (2006.01)
  G06F 3/14      (2006.01)
  H04M 1/725     (2006.01)
(52) U.S. Cl.
  CPC .............................. *H04M 1/72519* (2013.01)
  USPC .......... 455/566; 455/90.3; 345/156; 345/174; 715/864

(58) Field of Classification Search
  USPC ................. 455/550.1, 566, 90.3; 345/156, 345/173, 204; 715/702, 863, 864
  See application file for complete search history.

(56) References Cited

U.S. PATENT DOCUMENTS

| | | | | |
|---|---|---|---|---|
| 7,109,967 | B2* | 9/2006 | Hioki et al. ................... | 345/104 |
| 7,170,500 | B2* | 1/2007 | Canova, Jr. ................... | 345/173 |
| 7,443,380 | B2* | 10/2008 | Nozawa ........................ | 345/156 |
| 7,522,153 | B2* | 4/2009 | Ohtsuka ........................ | 345/156 |
| 8,130,207 | B2* | 3/2012 | Nurmi et al. ................... | 345/173 |
| 2004/0008191 | A1* | 1/2004 | Poupyrev et al. ............. | 345/184 |
| 2004/0049743 | A1* | 3/2004 | Bogward ....................... | 715/531 |
| 2004/0212588 | A1* | 10/2004 | Moriyama ..................... | 345/156 |
| 2006/0238494 | A1* | 10/2006 | Narayanaswami et al. ... | 345/156 |
| 2007/0085845 | A1* | 4/2007 | Kikuchi et al. ............... | 345/204 |
| 2007/0247422 | A1* | 10/2007 | Vertegaal et al. ............. | 345/156 |
| 2008/0303782 | A1* | 12/2008 | Grant et al. ................... | 345/156 |
| 2009/0002140 | A1* | 1/2009 | Higa ........................... | 340/407.1 |
| 2009/0019401 | A1* | 1/2009 | Park et al. ..................... | 715/841 |
| 2009/0051830 | A1* | 2/2009 | Matsushita et al. ........... | 348/836 |
| 2009/0219247 | A1* | 9/2009 | Watanabe et al. ............. | 345/157 |
| 2010/0011291 | A1* | 1/2010 | Nurmi ........................... | 715/702 |
| 2010/0029335 | A1* | 2/2010 | Vartanian ..................... | 455/566 |
| 2010/0045705 | A1* | 2/2010 | Vertegaal et al. ............. | 345/661 |
| 2010/0053081 | A1* | 3/2010 | Jee et al. ....................... | 345/157 |
| 2010/0141605 | A1* | 6/2010 | Kang et al. ................... | 345/174 |

* cited by examiner

*Primary Examiner* — Duc M Nguyen
(74) *Attorney, Agent, or Firm* — Birch, Stewart, Kolasch & Birch, LLP

(57) ABSTRACT

The present invention relates to a mobile terminal equipped with flexible display. The controller changes a screen displayed on the flexible display or controls the operation according to a bent part of the flexible display.

30 Claims, 21 Drawing Sheets

(a)

(b)

(c)

(d)

(a)　　　　　　　　　(b)　　　　　　　　　(c)

(a)  (b)  (c)

FIG. 11
(a)
(b)
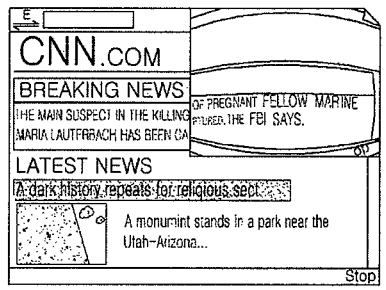
(c)
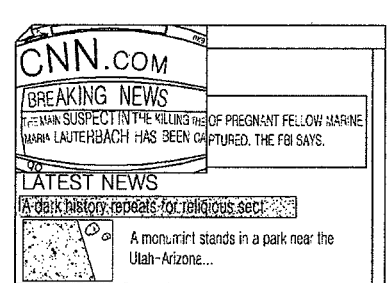
(d)

FIG. 19
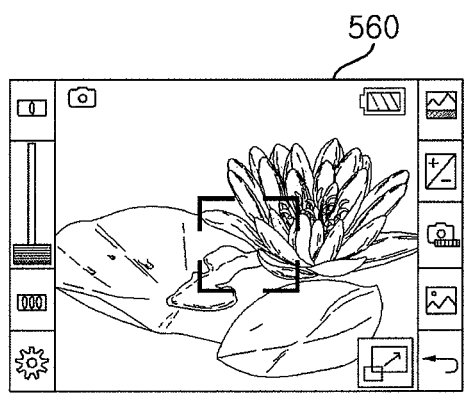
(a)
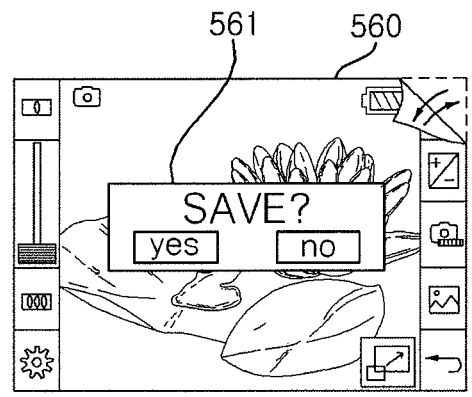
(b)

(a)　　　　　　　(b)

(a)　　　　　　　(b)

MOBILE TERMINAL EQUIPPED WITH FLEXIBLE DISPLAY AND CONTROLLING METHOD THEREOF

CROSS-REFERENCE TO RELATED APPLICATION

This application claims the benefit of Korean Application No. 10-2008-0086441, filed Sep. 2, 2008 in the Korean Intellectual Property Office, the disclosure of which is incorporated herein by reference.

BACKGROUND OF THE INVENTION

1. Field of the Invention

The present invention relates to a mobile terminal equipped with flexible display and an controlling method of the mobile terminal, and more particularly, to a mobile terminal including a flexible display and an controlling method of the mobile terminal, in which a screen effect applied to a display region on the flexible display can be changed according to whether the flexible display is bent.

2. Description of the Related Art

A mobile terminal is a portable device equipped with one or more of functions for performing voice and video communications, inputting and outputting information, storing data and so on while being carried with. As the types of services provided by mobile terminals diversify, an increasing number of mobile terminals have been equipped with various complicated functions such as capturing photos or moving pictures, playing music files or moving image files, providing game programs, and receiving broadcast programs and have thus evolved into multimedia players.

In order to implement the complicated functions, a variety of attempts have been made to the mobile terminal, implemented in the form of a multimedia player, in terms of hardware or software. For example, there is user interface environment to provide convenient search function or choice function. As mobile terminals are thought personal things to express user's individuality, there are requests to change a various design form such as a double-sided LCD (Liquid Crystal Display) or touch screen Space allocation for user interface such as display unit or keypad is limited in mobile terminal, because mobility or size of mobile terminal should be considered. Therefore, in order to use various functions provided from a mobile terminal, it is necessary to operate a mobile terminal with new input-output method instead of serial choice method in the complicated menu structure.

SUMMARY OF THE INVENTION

According to an aspect of the present invention, there is provided a controlling method of a mobile terminal, the controlling method including detecting whether a part of display region of the flexible display is bent; and changing a screen displayed on the display region according to the bent part of the display region when the bent is detected.

According to another aspect of the present invention, there is provided a mobile terminal including a flexible display configured to display a screen; a sensing unit configured to determine whether a part of display region of the flexible display is bent; a controller configured to change the screen displayed on the display region according to the bent part of the flexible display, wherein if the results of the sensing unit indicate that the region is bent.

BRIEF DESCRIPTION OF THE DRAWINGS

The above and other features and advantages of the present invention will become more apparent by describing in detail preferred embodiments thereof with reference to the attached drawings in which:

FIG. 8 through 25 illustrate a diagrams for controlling method of a mobile terminal according to an exemplary embodiment of the present invention with various exemplary embodiments.

Figure 1:
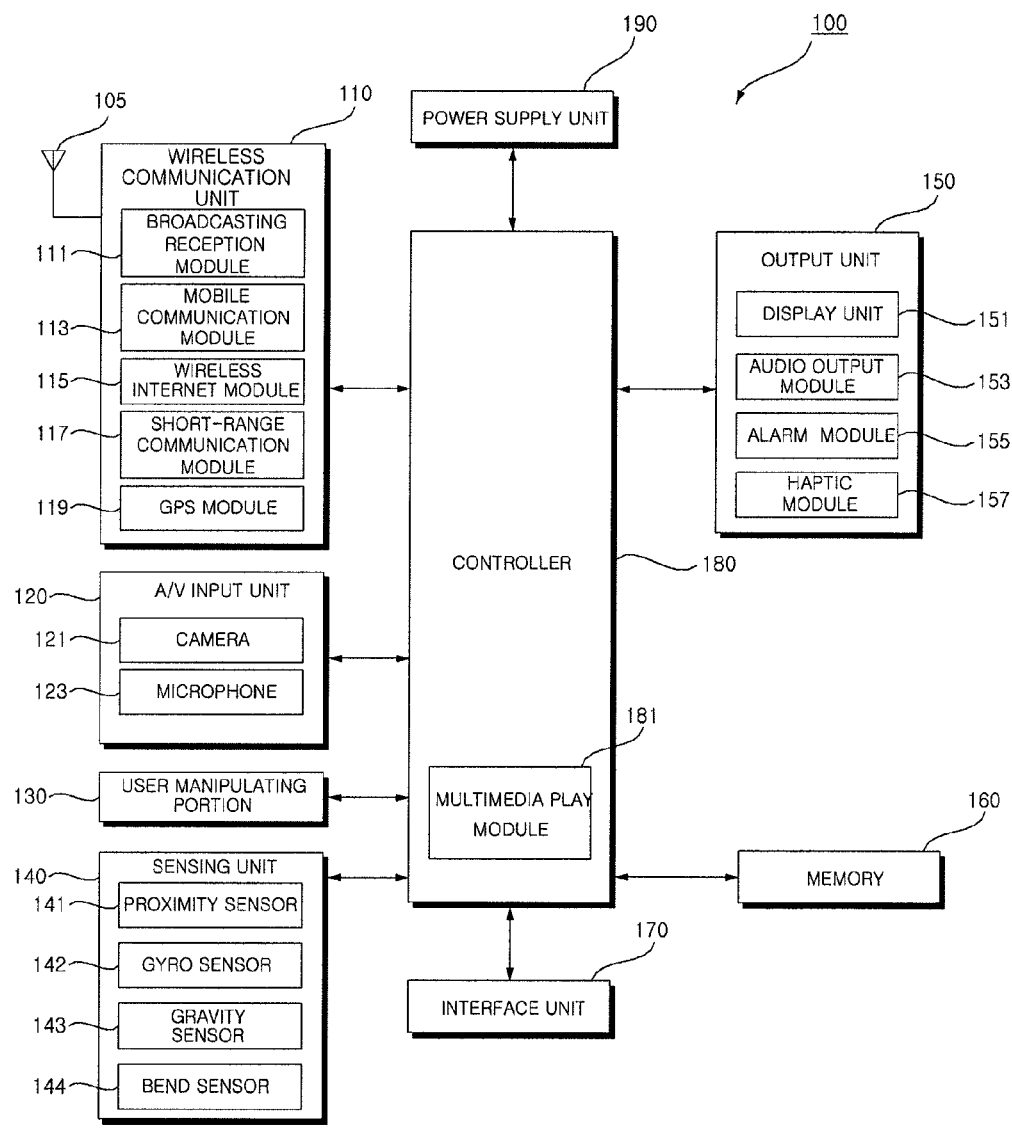
FIG. 1 illustrates a block diagram of a mobile terminal according to an exemplary embodiment of the present invention.

110: a wireless communication unit
120: an audio/video (A/V) input unit 120
130: a user input unit
140: a sensing unit
150: an output unit
160: a memory
170: an interface unit
180: a controller

DETAILED DESCRIPTION OF THE INVENTION

The present invention will hereinafter be described in detail with reference to the accompanying drawings in which exemplary embodiments of the invention are shown.

FIG. 1 illustrates a block diagram of a mobile terminal in accordance with an embodiment of the present invention. From a viewpoint of constituent elements according to their functions, the mobile terminal in accordance with an embodiment of the present invention is described with reference to FIG. 1.

Referring to FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. When the constituent elements are implemented in actual applications, two or more of the constituent elements may be combined into one constituent element or one constituent element may be divided into two or more constituent elements, if appropriate.

The wireless communication unit 110 may include a broadcasting receiving module 111, a mobile communication module 113, a wireless Internet module 115, a short-range communication module 117, a global positioning system (GPS) module 119 and so on.

The broadcasting receiving module 111 receives at least one of broadcasting signals and broadcasting-associated information from an external broadcasting management server through broadcasting channels. The broadcasting channels may include a satellite channel, a terrestrial wave channel and the like. The broadcasting management server can refer to a server for creating and transmitting at least one of broadcasting signals and broadcasting-associated information or a sever for receiving at least one of previously generated broadcasting signals and previously generated broadcasting-associated information and transmitting it to a terminal.

The broadcasting-associated information can refer to information pertinent to a broadcasting channel, a broadcasting program and/or a broadcasting service provider. The broadcasting signal may include not only TV broadcasting signals, radio broadcasting signals, and data broadcasting signals, but also broadcasting signals in which TV broadcasting signals or radio broadcasting signals are combined with data broadcasting signals. The broadcasting-associated information may be provided over a mobile communication network. The broadcasting-associated information may be received by the mobile communication module 113. The broadcasting-associated information can exist in various forms. For instance, the broadcasting-associated information can exist in the form of the electronic program guide (EPG) of the digital multimedia broadcasting (DMB), the electronic service guide (ESG) of the digital video broadcast-handheld (DVB-H) or the like.

The broadcasting receiving module 111 receives broadcasting signals using various broadcasting systems. In particular, the broadcasting receiving module 111 can receive broadcasting signals using a digital broadcasting system, such as the digital multimedia broadcasting-terrestrial (DMB-T), the digital multimedia broadcasting-satellite (DMB-S), the media forward link only (MediaFLO), the digital video broadcast-handheld (DVB-H), and the integrated services digital broadcast-terrestrial (ISDB-T). The broadcasting receiving module 111 may be constructed to be suitable for not only the digital broadcasting systems, but also the entire broadcasting systems that provide broadcasting signals. At least one of broadcasting signals and/or broadcasting-associated information, which are received through the broadcasting receiving module 111, may be stored in the memory 160.

The mobile communication module 113 transmits and receives radio signals to and from at least one of a base station, an external terminal, and a server over a mobile communication network. Here, the radio signals may include voice call signals, video call signals, or various forms of data according to transmission/reception of text/multimedia messages.

The wireless Internet module 115 refers to a module for wireless Internet access. The wireless Internet module 115 may be built in the mobile terminal 100 or external to the mobile terminal 100. The short-range communication module 117 refers to a module for short-range communication. Local area communication technology can employ Bluetooth, radio frequency identification (RFID), infrared data association (IrDA), ultra wideband (UWB), ZigBee or the like. The GPS module 119 receives position information from a plurality of GPS satellites.

The A/V input unit 120 is adapted to input audio signals or video signals and may include a camera 121, a microphone 123, and so on. The camera 121 processes image frames, such as still images or motion images, which are captured by an image sensor in the video call mode or the capturing mode. The processed image frames may be displayed on a flexible display 151.

Image frames processed by the camera 121 may be stored in the memory 160 or transmitted to the outside through the wireless communication unit 110. A plurality of the cameras 121 may be provided according to the configuration of a terminal.

The microphone 123 receives external sound signals in the call mode, the recording mode, the voice recognition mode, etc. and converts the received sound signals into electrical voice data. In the call mode, the processed voice data may be converted into a format, which may be transmitted to a mobile communication base station through the mobile communication module 113, and then output. The microphone 123 can employ a variety of noise removal algorithms for removing noise occurring in the process of receiving external sound signals.

The user input unit 130 generates key entry data, which is input by a user in order to control the operation of the terminal. The user input unit 130 may include a keypad, a dome switch, a touch pad (static pressure/capacitance), a jog wheel, a jog switch, a finger mouse or the like. If the flexible display 151 forms a layer structure along with a touch pad, the resulting architecture may be referred to as a touch screen.

The sensing unit 140 senses a current status of the mobile terminal 100, such as a closed state of the mobile terminal 100, the position of the mobile terminal 100, whether a user touches the mobile terminal 100 or not, and so on and generates a sensing signal for controlling the operation of the mobile terminal 100. For example, when the mobile terminal 100 is a slide phone type, the sensing unit 140 can sense whether the slide phone is opened or not. The sensing unit 140 may also have the functions of sensing whether the power supply unit 190 supplies power or not, whether the interface unit 170 is connected to an external device, and so on.

The sensing unit 140 may include a proximity sensor 141. The proximity sensor 141 may detect an object that is nearby and approaching and may determine whether there is an object nearby without any mechanical contact. The proximity sensor 141 may detect an object that is nearby and approaching by detecting a variation in an alternating magnetic field or the rate of variation of static capacitance. The sensing unit 140 may include two or more proximity sensors 141.

The sensing unit 140 may also include a gyro sensor 142. The gyro sensor 142 is a sensor sensing the motion of an object by using a gyroscope. Examples of the gyro sensor 142 include an inertial sensor and an acceleration sensor. A gyroscope is classified into a mechanical gyroscope, a ring laser gyroscope, or an optic fiber gyroscope. The gyro sensor 142 may sense the motion of an object and may thus provide a signal for controlling the mobile terminal 100.

The sensing unit 140 may include a gravity sensor 143. The gravity sensor 143 is a concept including all kinds of sensors that sense the rotation state of a mobile terminal. The gravity sensor 143 may have a weight coupled to a variable resistor and be configured to sense a current rotation state of a terminal according to a change in resistance due to the rotation of the terminal, or may have a conductive object at its center and be configured to sense the rotation state of a terminal in response to a direction in which the conductive object is brought in contact with the terminal in response to the rotation.

The sensing unit 140 may include a bend sensor 144. The bend sensor 144 may convert information indicating the position at which the flexible display 151 is bent or folded into an electric signal. The bend sensor 144 may output different signals for different degrees to the degree to which the flexible display 151 is bent or folded. Therefore, the controller 180 may determine the position at and the degree to which the flexible display 151 is bent or folded based on output data provided by the bend sensor 144. The bend sensor 144 may be placed in contact with the flexible display 151. The bend sensor 144 and the sensing unit 140 may form a layer structure together. In this case, the bend sensors 144 may be uniformly distributed on the flexible display 151.

The output unit 150 is adapted to output audio signals, video signals or alarm signals and may include the flexible display 151, a sound output module 153, an alarm unit 155, a haptic module 157 and so on.

If the flexible display 151 is bent, the output unit 150 output a sound though the sound output module 153 and a haptic effect though the haptic module 157 corresponding to control order from the controller 180.

The flexible display 151 displays and outputs information processed in the mobile terminal 100. For example, when a mobile terminal is in the call mode, the flexible display 151 displays a user interface (UI) or a graphic user interface (GUI), which is pertinent to a call. When the mobile terminal 100 is in a video call mode or a capturing mode, the flexible display 151 can display captured or received images individually or simultaneously and also display a UI or a GUI.

Meanwhile, in the case in which the flexible display 151 and a touch pad form a layer structure together and thus form a touch screen, as described above, the flexible display 151 may also be used as an input device other than an output device. If the flexible display 151 is constructed of a touch screen, it may include a touch screen panel, a touch screen panel controller and so on. In this case, the touch screen panel is a transparent panel attached to the outside and may be connected to an internal bus within the mobile terminal 100. The touch screen panel continues to monitor whether there is a touch input, and when there is a touch input, sends corresponding signals to the touch screen panel controller. The touch screen panel controller processes the corresponding signals received from the touch screen panel and transmits the corresponding data to the controller 180, so that the controller 180 can understand whether there has been a touch input or which area of the touch screen has been touched.

The flexible display 151 may include at least one of a liquid crystal display, a thin film transistor-liquid crystal display, an organic light-emitting diode, a flexible display, and a three-dimensional (3D) display. The mobile terminal 100 may include two or more flexible displays 151. For example, the flexible display 151 may stretch on both sides of the mobile terminal 100 and be disposed on a front casing.

The sound output module 153 outputs audio data, which is received from the wireless communication unit 110 in the incoming call mode, the call mode, the record mode, the voice recognition mode, the incoming broadcasting mode or the like or stored in the memory 160. The sound output module 153 also outputs sound signals pertinent to the functions performed in the mobile terminal 100, for example, sound of a received call signal and sound of a received message. The sound output module 153 may include a speaker, a buzzer or the like.

The alarm unit 155 outputs signals to inform the occurrence of events in the mobile terminal 100. For example, the events occurring in the mobile terminal 100 may include an incoming call signal, a received message, an entered key signal input and so on. The alarm unit 155 may also output signals to inform the occurrence of events in different ways other than the audio or video signals. For example, the alarm unit 155 may output signals in a vibration form. When a call signal is received or a message is received, the alarm unit 155 may output a signal to inform the reception of the call signal or the message. Alternatively, when a key signal is input, the alarm unit 155 may output a signal as a feedback to the input key signal. A user can notice the occurrence of an event through a signal output by the alarm unit 155. It should be noted that a signal to inform the occurrence of an event might also be output through the flexible display 151 or the sound output module 153.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 can store programs necessary to process and control the controller 180 and also function to temporarily store input or output data (for example, a phonebook, messages, still images, motion images and the like).

The memory 160 may include at least one type of storage media, including a flash memory type, a hard disk type, a multimedia card micro type, card type memory (for example, SD memory, XD memory, and so on), RAM, and ROM. The mobile terminal 100 may also manage a web storage serving as the storage function of the memory 160 on an Internet.

The interface unit 170 functions as an interface with all external devices connected to the mobile terminal 100. Examples of the external devices connected to the mobile terminal 100 may include a wired/wireless headset, an external charger, wired/wireless data ports, a memory card, a card socket such as subscriber identification module (SIM)/user identity module (UIM) cards, an audio input/output (I/O) terminal, a video I/O terminal, an earphone, and so on. The interface unit 170 can receive data or may be supplied with power from the external devices, transfer the data or power to respective constituent elements of the mobile terminal 100, and transmit data of the mobile terminal 100 to the external devices.

The controller 180 typically controls the operation of each of the elements and controls an overall operation of the mobile terminal 100. For example, the controller 180 can perform pertinent controls and processes for voice call, data communication, video telephony, and so on. The controller 180 may include a multimedia play module 181 for playing multimedia. The multimedia play module 181 may be constructed in hardware within the controller 180 or constructed in software separately from the controller 180.

The power supply unit 190 is supplied with external power source or internal power source and supplies power source necessary for the operation of the each constituent element under the control of the controller 180.

From a viewpoint of the constituent elements according to their functions, the mobile terminal pertinent to the present invention has been described so far. From a viewpoint of the constituent elements according to their external shapes, the mobile terminal pertinent to the present invention will be hereinafter described with reference to FIGS. 2, 3 and 4. Hereinafter, a bar type mobile terminal equipped with a full touch screen, of several types of mobile terminals such as a folding type, a bar type, a swing type, and a sliding type, is described as an example, for convenience of description. However, it should be understood that the present invention is not limited to the bar type mobile terminal, but instead may be applied to all types of mobile terminals, including the above types.

Figure 2:
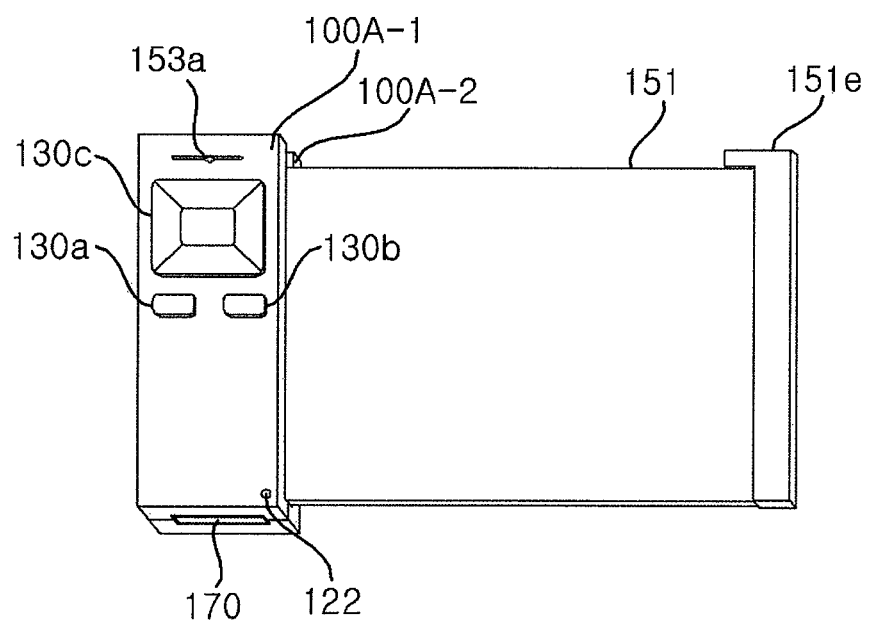
FIG. 2 illustrates a perspective view of the mobile terminal shown in FIG. 1.

FIG. 2 illustrates a perspective view of the mobile terminal shown in FIG. 1. FIG. 2(a) illustrates a front perspective view of the mobile terminal shown in FIG. 1, FIG. 2(b) illustrates a rear perspective view of the mobile terminal shown in FIG. 1. FIG. 2(c) illustrates a perspective view of the mobile terminal which is folded or bent.

Referring to FIG. 2, a casing constituting an external appearance of the mobile terminal 100 of the present invention is comprised of a front casing 100A-1 and a rear casing 100A-2. A variety of electronic components are embedded in space formed by the front casing 100A-1 and the rear casing 100A-2. At least one middle casing may be further disposed between the front casing 100A-1 and the rear casing 100A-2. The casings may be formed by injecting synthetic resin or may be formed from metal materials such as stainless steel (STS) or titanium (Ti).

A first sound output module 153a, a first user manipulating portion 130a, a second user manipulating portion 130b, a third user manipulating portion 130c, and a microphone 122 may be disposed in the main body, more specifically, the front casing 100A-1.

The flexible display 151 could be extended from a space which is between a front casing 100A-1 and a rear casing 100A-2.

A packing unit 151e which is disposed on the side of the flexible display 151 may move to from side to side. If the packing unit 151e moves to right, the flexible display which has been rolled in space formed by the front casing 100A-1 and the rear casing 100A-2 is stretched.

The stretched flexible display 151 has display region.

If the flexible display 151 is stretched, the controller 180 calculates a size of the display region corresponding to a size of the stretched flexible display. The controller 180 changes object displayed on the display region according to the extent of the stretched flexible display 151.

The flexible display 151 may be configured in such a manner that a touch pad is overlapped with the flexible display 151 in a layered structure and therefore the flexible display 151 operates as a touch screen, thereby enabling the input of information by a user's touch.

The flexible display 151 may be rolled in space which is formed between the front casing 100A-1 and the rear casing 100A-2.

The flexible display 151 includes a liquid crystal display (LCD), an organic light-emitting diode (OLED) and the like, which visually display information.

The first sound output module 153a may be implemented in the form of a receiver or speaker. The microphone 122 may be implemented in such a way as to appropriately receive a user's voice, other sound, etc.

The first to third user manipulating portions 130a, 130b, and 130c may be collectively called the user manipulating portion 130. The user manipulating portion 130 may adopt any kind of a method as long as it supports a tactile manner.

For example, the user manipulating portion 130 may be implemented using a dome switch or a touch pad, which is able to receive commands or information by push or touch manipulation of a user, or may be implemented using a wheel or jog method for rotating a key, a method employing Joystick or the like. In terms of the function, the first user manipulating portion 130a may be adapted to input commands such as start, end, and call. The second user manipulating portion 130b may be adapted to select an operating mode and so on. The third user manipulating portion 130c may operate as a hot key for activating special functions within the mobile terminal 100.

If user's finger approaches the flexible display 151, a proximity sensor 141 detects the user's finger and output a proximity signal. The proximity sensor 141 may output different proximity signals according to the distance to the user's finger.

Assuming that a distance in which the proximity sensor approaches a detection object and outputs a proximity signal is a detection distance. If proximity signals output from a plurality of the proximity sensors having different detection distances are compared with each other, it can be known how near the object approaches the proximity sensors.

If a plurality of proximity sensors having different detection areas is disposed and which proximity signal is output from which one of the proximity sensors is understood, it can be known that a detection object approaches which area of the display unit 151, whether a detection object moves close to the display unit 151, and so on. Accordingly, the controller 180 can perform a variety of operation controls according to a degree in which a user's finger, etc. approaches the display unit 151, a proximity location thereof, and so on.

If the user tilts or shakes the mobile terminal 100, the gyro sensor 142 may sense that the mobile terminal 100 has been moved. Thereafter, the gyro sensor 142 may generate a signal corresponding to the movement of the mobile terminal 100 and may output the signal to the control unit 180. Then, the control unit 180 may obtain various information regarding the movement of the mobile terminal 100 such as the direction, angle, velocity, and magnitude of the movement of the mobile terminal 100 and a current location of the mobile terminal from the signal generated by the gyro sensor 142.

The control unit 180 may keep track of the movement of the mobile terminal 100 with the information obtained from the signal generated by the gyro sensor 142. The type of information that can be obtained from the gyro sensor 142 may vary according to the type of the gyro sensor 142. Thus, the type of gyro sensor 142 that can be used in the mobile terminal 100 may be determined by the type of motion information desired to be detected from the mobile terminal 100. The mobile terminal 100 may include at least one gyro sensor 142. The control unit 180 may control the gyro sensor 142 to be driven only when a certain application is executed.

If the user rotates the mobile terminal 100, the gravity sensor 143 may sense that the mobile terminal 100 has been moved. Thereafter, the gravity sensor 143 may generate a signal corresponding to the movement of the mobile terminal 100 and may output the signal to the control unit 180. Then, the control unit 180 may obtain various information regarding the each 90 degrees movement of the mobile terminal 100 from the signal generated by the gravity sensor 143 and rotate a screen displayed on the display region.

To rotate a screen displayed on the display region can be operated minutely. Each 90 degrees rotation of a screen may be desirable for convenience of displaying and real-time displaying. For example, if the mobile terminal is rotated 90 degrees; the controller 180 detects 90 degrees movement of the mobile terminal 100 from the signal generated by the gravity sensor 143. Then, a screen displayed on the display region is rotated 90 degrees. If the mobile terminal is rotated 180 degrees; a screen displayed on the display region is reversed top and bottom.

The controller 180 may detect a bent part of the flexible display 151 using sensors distributed on the flexible display such as a bend sensor, pressure sensor.

For example, if a distribution interval of the uniformly distributed bend sensor 144 is changed, the controller 180 detects the changed distribution interval. Then, region of the changed distribution interval regards as the first region. The first region is one of the regions which can be changed distribution interval on the bend sensor 144. For example, the first region may be one of the middle region or edges of the rectangular formed bend sensor 144. As the bend sensor 144 is placed in contact with the flexible display 151, the bend sensor 144 can sense signal from the way in which the flexible display 151 is bent. The controller 180 can detect bent part using changed pressure distribution which is detected by pressure sensor.

The controller 180 changes a screen displayed on the flexible display 151 according to the detected bent region, bent direction, bent area, bent angle, and speed when the bent is detected corresponding to a signal from the sensing unit 140. And the controller 180 may execute another operation.

Figure 3:
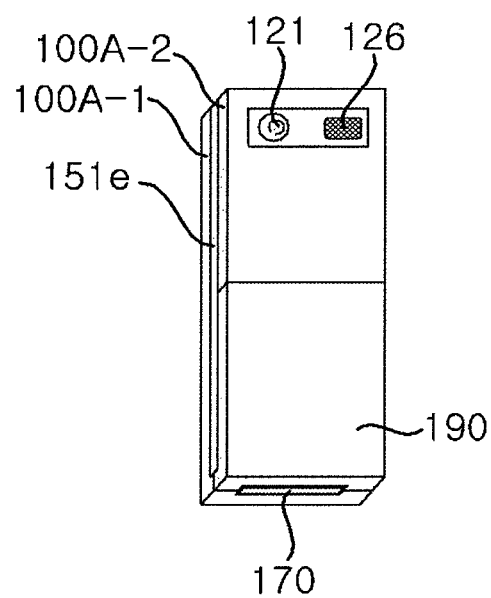
FIG. 3 illustrates a rear perspective view of the mobile terminal shown in FIG. 2.

FIG. 3 illustrates a rear perspective view of the mobile terminal shown in FIG. 2. Referring to FIG. 3, a packing unit 151e may be disposed on the side of the casing 100A-2, a camera 121 may be disposed on the side of the rear casing 100A-2.

For example, the first camera 121a may have low pixels sufficiently enough to photograph a user's face and send the photographed face to a counterpart in the video call or the like. The second camera 121b may have high pixels because photographed subjects are not transmitted immediately after the photographing.

The second camera 121b has a photographing direction, which is substantially opposite to that of the first camera 121a, and can have different pixels from that of the first camera 121a.

A flash 125 and a mirror (not shown) can be further disposed adjacent to the second camera 121b. The flash 125 is configured to illuminate a subject when the subject is photographed using the second camera 121b. The mirror is configured to reflect a user when the user has his face, etc. photographed (self-photographing) using the second camera 121b.

A second sound output module (not shown) may be further disposed in the second rear casing 100B-2. The second sound output module can realize a stereo function together with the first sound output module 153a and can also be used for a call in the speakerphone mode.

An antenna (not shown) for receiving broadcasting signals as well as an antenna for a call, interface unit 170, and so on may be disposed on one side of the second rear casing 100B-2. The antenna 105 can be drawn out from the second body 100B.

The interface unit 170 becomes a passage through which the mobile terminal 100 can exchange data, etc. with external devices. For example, the interface unit 170 may be at least one of a connector for connecting to an earphone, a port for short-range communications, and power supply terminals for supplying power to the mobile terminal 100, in a wired or wireless manner. The interface unit 170 may be a card socket for accommodating external cards, such as a subscriber identification module (SIM) or a user identity module (UIM), and a memory card for storing information.

The power supply unit 190 for supplying power to the mobile terminal is mounted on the part of the rear casing 100A-2. The power supply unit 190 may be, for example, a rechargeable battery and may be detachably coupled to the rear casing 100A-2 for charging purpose, etc.

It has been described above that the second camera 121b and the like are disposed in the second body 100B. However, the present invention is not limited to the above arrangement. Further, the first camera 121a may be disposed rotatably.

Figure 4:
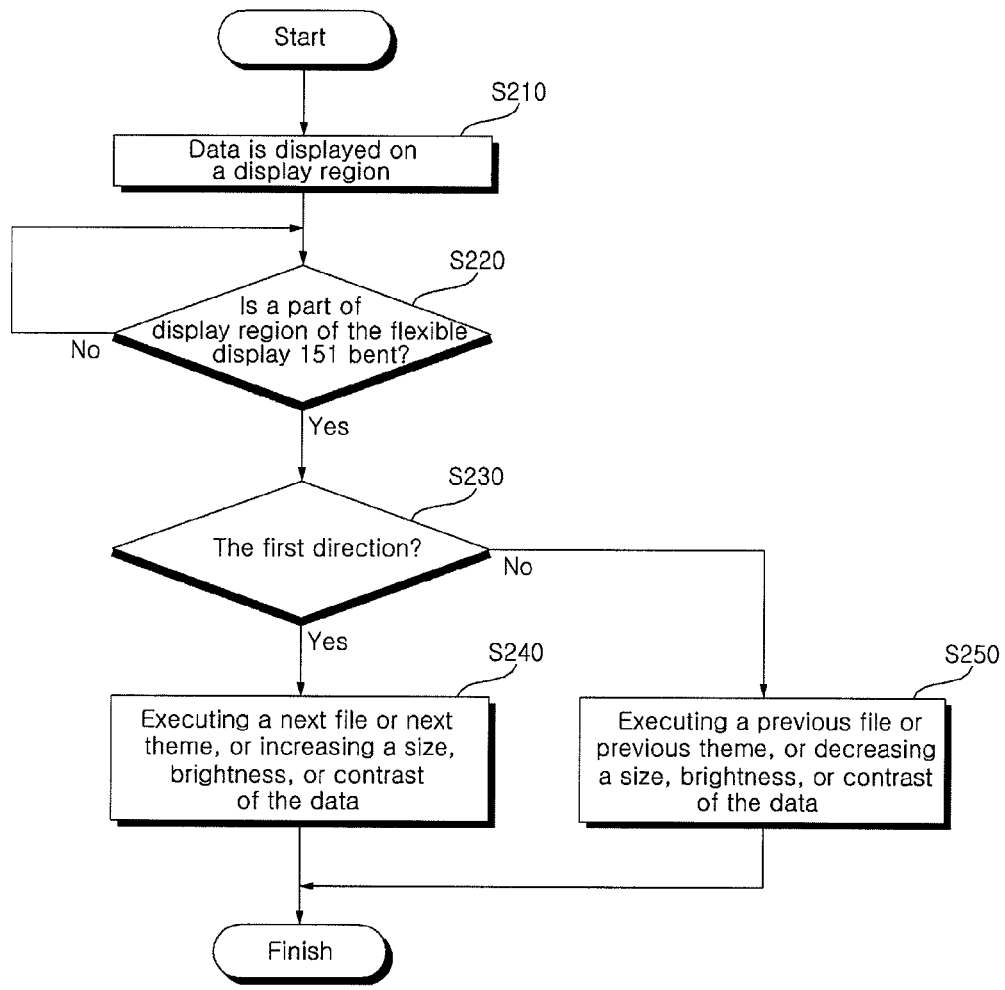
FIG. 4 through 7 illustrate a flowchart of an controlling method of a mobile terminal according to an exemplary embodiment of the present invention.

FIG. 4 illustrates a flowchart of a controlling method of a mobile terminal according to an exemplary embodiment of the present invention. A data displayed on a display region is changed according to a bent part of flexible display of the mobile terminal.

Referring to FIG. 4, a prescribed data is displayed on a display region of the flexible display 151(S210). Assuming that an image on the display region according to movement of the mobile terminal is the prescribed data. Examples of the data include idle image, menu image, capturing photos, web page provided by a website, a moving image play screen, and text viewer image.

If a part of display region of the flexible display 151 is bent, the sensing unit 140 detects the bent part (S220). The sensing unit 140 generates a sensing signal using a sensor which is distributed on the flexible display 151 and inputs the sensing signal to the controller 180.

If the flexible display 151 is bent to the first direction, the controller 180 changes a type, size, or appearance of a screen and executes a prescribed operation. Assuming that a data displayed on the display region is the screen.

For example, the controller 180 changes from a data to a next data. The data may be one of an image data, music data, video data, and text data displayed on the display region. The controller 180 can executes the next data. For example, the controller 180 can display the next image data, play the next music data or display the next text data (S240).

The controller 180 extends size of an image data or an idle image displayed on the display region. The controller 180 may also increase a brightness or contrast of the screen and change theme of an idle image or a menu image to the next theme.

If the flexible display 151 is bent to the second direction which is the opposite direction of the first direction, the controller 180 changes from a data to a previous data. The data may be one of an image data, music data, video data, and text data displayed on the display region. The controller 180 can executes the previous data. For example, the controller 180 can display the previous image data, play the previous music data or display the previous text data (S250).

The controller 180 reduces size of an image data or an idle image displayed on the display region. The controller 180 may also decrease a brightness or contrast of the screen and change theme of an idle image or a menu image to the previous theme.

The controller 180 may execute a next data, extend size of the screen, adjust brightness or contrast, or change theme of the screen according to the bent part of the display region or according to image displayed on the display region.

Figure 5:
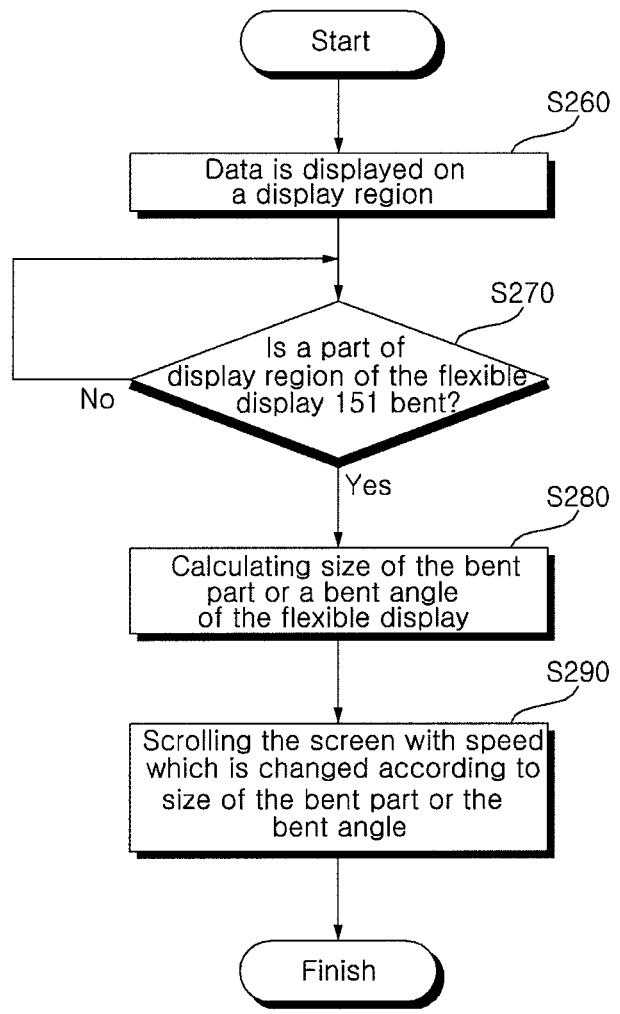

FIG. 5 illustrates a flowchart of a controlling method of a mobile terminal according to size of a bent part of flexible display of the mobile terminal or a bent angle of flexible display of the mobile terminal.

The controller 180 displays a screen including a prescribed data on a display region of the flexible display 151 according to execution of mobile terminal (S260). Assuming that a data displayed on the display region is the screen. If the controller 180 detects a bent part of the display region (S270), the controller 180 calculates size of the bent part or a bent angle of the flexible display (S280).

The controller 180 may calculate an area of the bent part or the bent angle according to a number of a sensor which can generate a signal, distribution of the sensor, and signal intensity from the sensor based on a signal inputted from the sensing unit 140.

The controller 180 scrolls the screen with speed which is changed according to size of the bent part or the bent angle from the controller 180 (S290).

The controller 180 changes a direction of scrolling according to the detected bent direction. If the flexible display 151 is bent to the first direction, the controller 180 scrolls down the screen. If the flexible display 151 is bent to the second direction, the controller 180 scrolls up the screen. In some cases, the controller 180 scrolls right and left.

The controller 180 can set scrolling speed of the screen according to the bent angle or bent speed.

Figure 6:
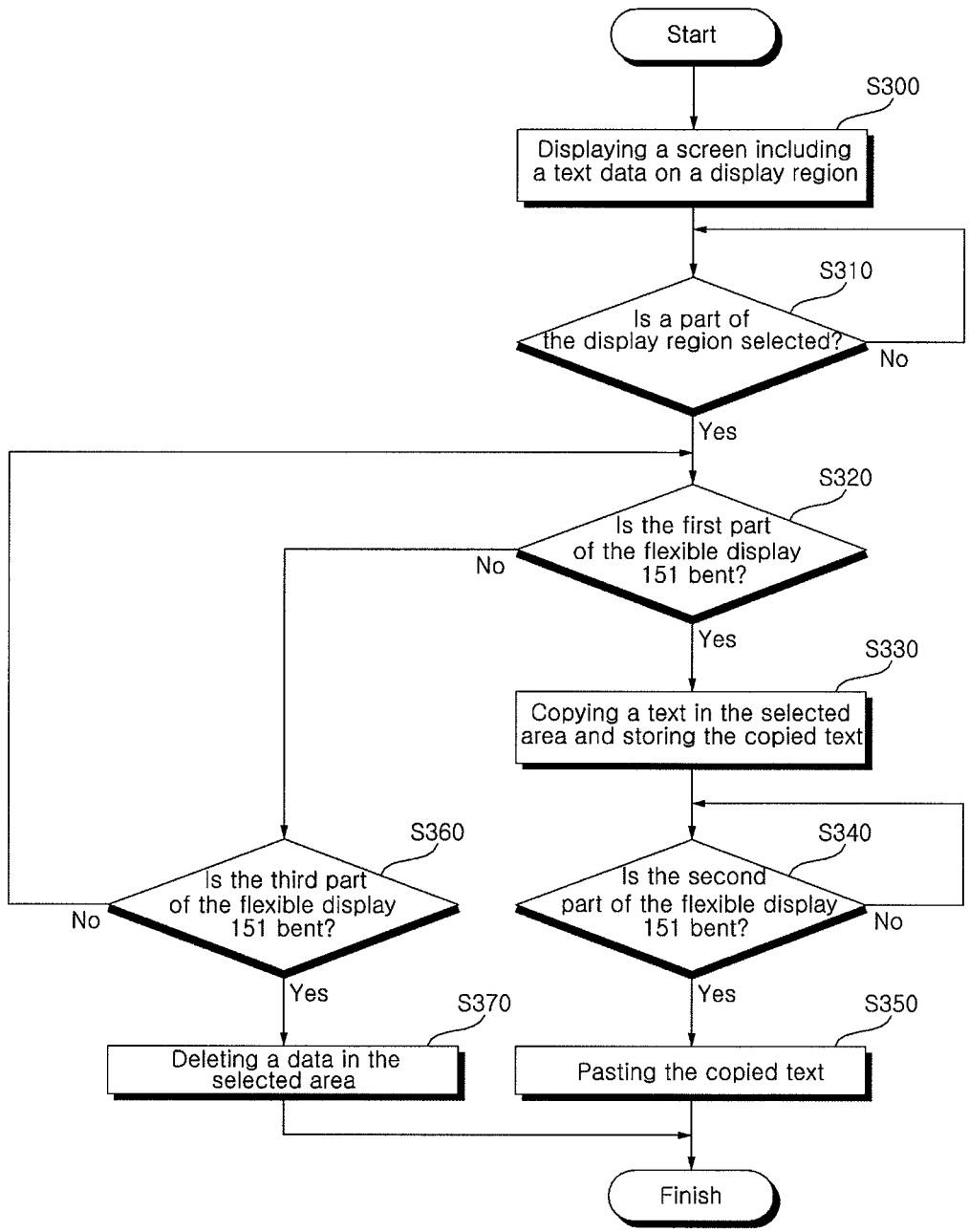

FIG. 6 illustrates a flowchart of a controlling method of a mobile terminal according to an exemplary embodiment of the present invention. A data displayed on a display region is changed according to a bent part of flexible display of the mobile terminal.

Referring to FIG. 6, the controller 180 displays a screen including a text data on a display region of the flexible display 151 (S300). Assuming that a data displayed on the display region is the screen. For example, the controller 180 may display a prescribed text data based on executed text viewer or display web data based on executed web browser.

If a part of the display region of the flexible display 151 is touched and dragged (S310), the controller 180 assumes a text data in the bent part is a selected area. The controller 180 may display the selected area differently from a text out of the part. For example, a text in the selected area may be displayed with a shadow or with a different background color.

If the first part of the flexible display 151 is bent, the sensing unit 140 detects the first part of the flexible display 151 (S320).

If the sensing unit 140 detects the first part which is bent, the controller 180 copies a text in the selected area and stores the copied text in the memory 160 (S330). In some ways, a text in the selected area may be stored in other apparatus.

If the second part of the flexible display 151 is bent (S340), the controller 180 copies a text in the selected area and pastes the copied text in the memory 160 (S350). The controller 180 may paste the copied text on a cursor location, and display copied text on the display region of the flexible display 151.

If a data displayed on the display region assumes a selected area and the third part of the flexible display 151 is bent (S360), the controller 180 deletes the selected area according to the third part is bent. The controller 180 deletes a data in the selected area on the display region (S370).

The first, the second and the third part of the flexible display 151 can be assumed one of top, bottom, right and left edge of the flexible display 151 or one of top, bottom, right and left side of flexible display 151. The first, the second and the third part of the flexible display 151 can be changed.

Figure 7:
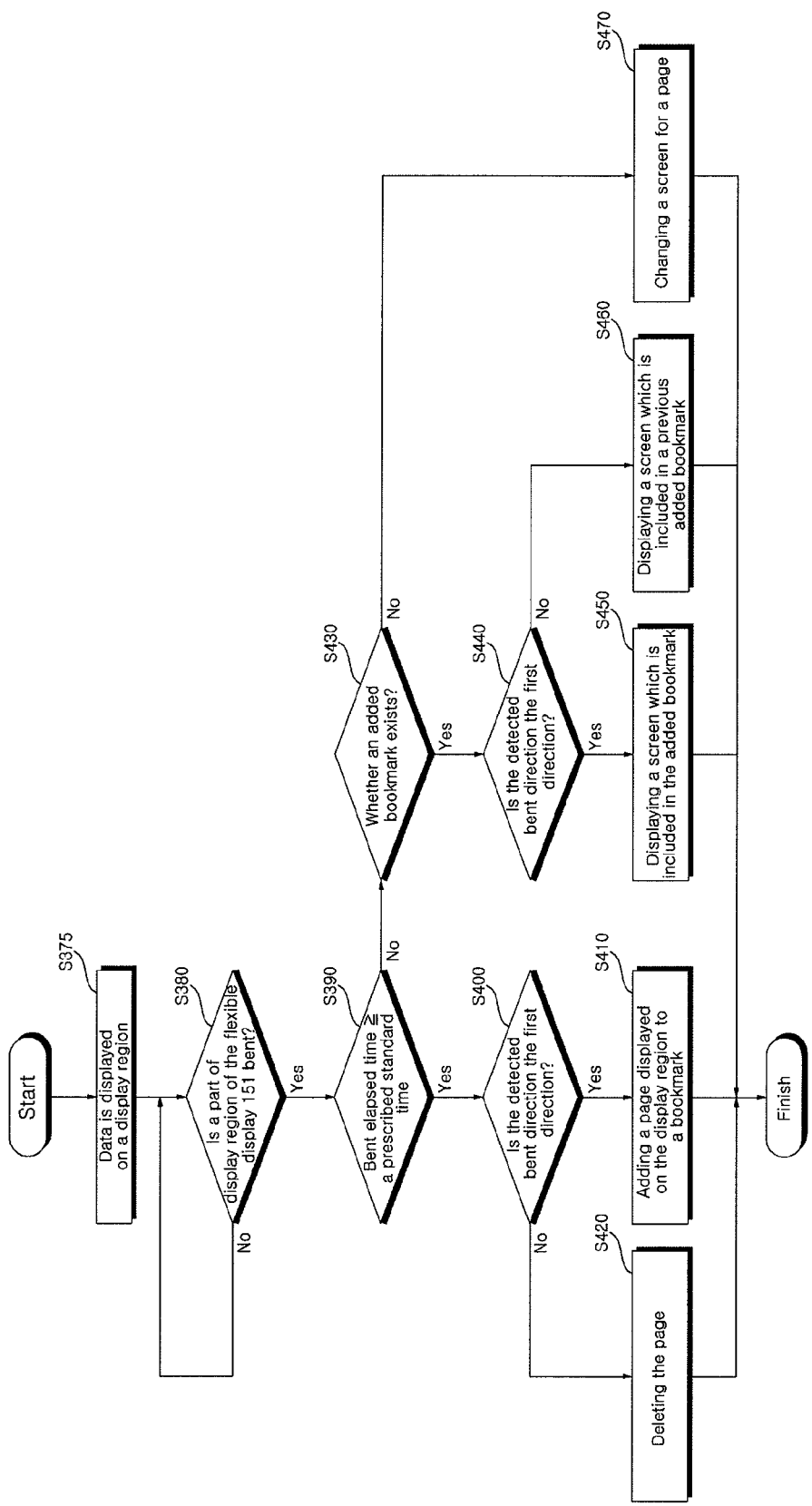

FIG. 7 illustrates a flowchart of a controlling method of a mobile terminal according to a bent elapsed time or a detected bent direction.

Referring to FIG. 7, the controller 180 displays a screen including a prescribed data on a display region of the flexible display 151 according to execution of mobile terminal (S375). Assuming that a data displayed on the display region is the screen. For example, a text viewer, web data image and text image can be displayed.

If a bent part of the display region is bent, the sensing unit 140 detects the bent part (S380). For the bent part is detected, the controller 180 calculates a bent elapsed time and a detected bent direction.

If the bent elapsed time is more than a prescribed standard time and the detected bent direction is the first direction (S390), the controller 180 adds a page displayed on the display region to a bookmark (S410). And then an icon or an image related to the bookmark may be displayed on a part of the display region.

If the bent elapsed time is more than a prescribed standard time and the detected bent direction is not the first direction, the controller 180 deletes a page displayed on the display region (S420). A bookmark icon or a bookmark image displayed on a part of the display region may be deleted.

If the bent elapsed time is not more than a prescribed standard time, the controller 180 decides whether an added bookmark exists (S430) and decides whether the detected bent direction is the first direction (S440).

If the added bookmark exists and the detected bent direction is the first direction, the controller 180 displays a screen which is included in the added bookmark (S450). If there is not another added bookmark, the controller 180 displays a last page of a data or the first added bookmark.

If the added bookmark exists and the detected bent direction is an opposite direction of the first direction, the controller 180 displays a screen which is included in a previous added bookmark (S460).

If the bent elapsed time is not more than a prescribed standard time and an added bookmark does not exist, the controller 180 scrolls up and down a screen or right and left the screen. The controller 180 may change a screen for a page (S470). Scrolling direction or changing a screen may be changed according to user's set.

FIGS. 8 through 25 illustrate diagrams for explaining the controlling method of the exemplary embodiment.

Figure 8:
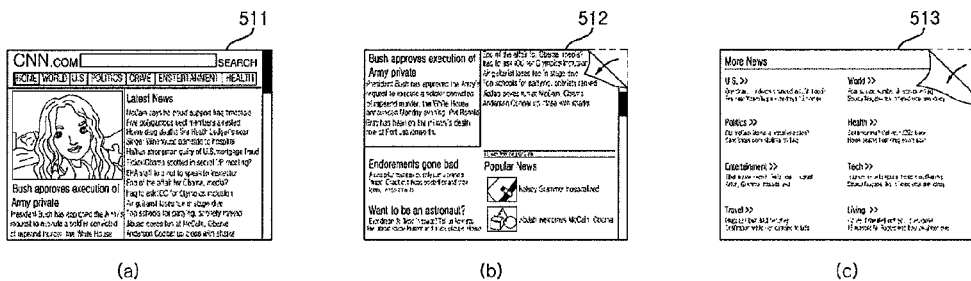
Figure 9:
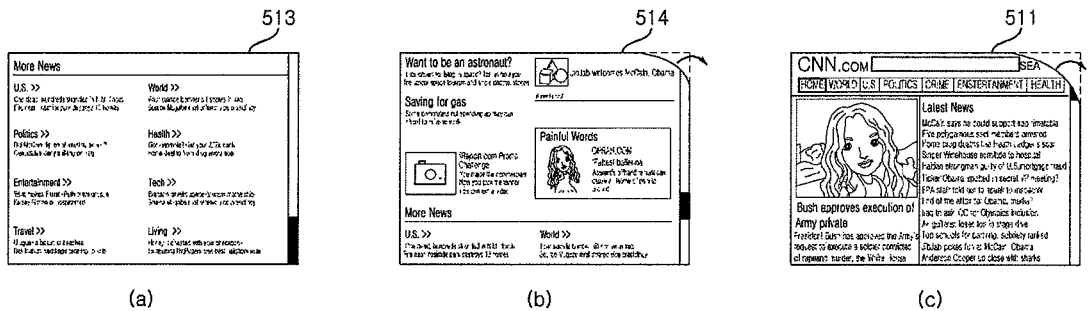

FIGS. 8 through 9 are examples that web data displayed on a display region is scrolled according to a bent part of the display region.

Referring to FIG. 8(a), web data is displayed on a display region of the flexible display 151 according to execution of web browser. The first region 511 of web data is displayed on the display region.

Referring to FIG. 8(b), if a part of the flexible display 151 is bent to the first direction in FIG. 8(a), the sensing unit 140 detects the bent part. The controller 180 scrolls down or changes a screen including the first region 511 and displays the second region 512 of web data is displayed on the display region according to the detected bent area.

Referring to FIG. 8(c), if a part of the flexible display 151 is bent to the firs direction in FIG. 8(a), the controller 180 scrolls down or changes a screen, and displays the third region 513 of web data is displayed on the display region according to the detected bent area.

The detected bent area in FIG. 8(b) is larger than the detected bent area in FIG. 8(c); moving speed or scrolling speed of the screen in FIG. 8(b) may be set bigger than moving speed or scrolling speed of the screen FIG. 8(c).

The controller 180 can change moving speed or scrolling speed of the screen according to a bent angle or speed when bent is detected.

Referring to FIG. 9(a), the third region 153 of web data is displayed on a display region of the flexible display 151.

Referring to FIG. 9(b), if a part of the flexible display 151 is bent to the second direction which is an opposite direction of the first direction, the controller 180 scrolls up or changes a screen including the third region 153 of web data and displays the fourth region 514 of web data is displayed on the display region according to the detected bent area.

Referring to FIG. 9(c), if a part of the flexible display 151 is bent to the second direction and a detected bent area in FIG. 9(c) is larger than a detected bent area in FIG. 9(b), the controller 180 scrolls up to the first region 511 of web data or changes a screen.

The controller 180 may scroll up or down a screen or change a screen according to the bent part or detected bent area.

Figure 10:
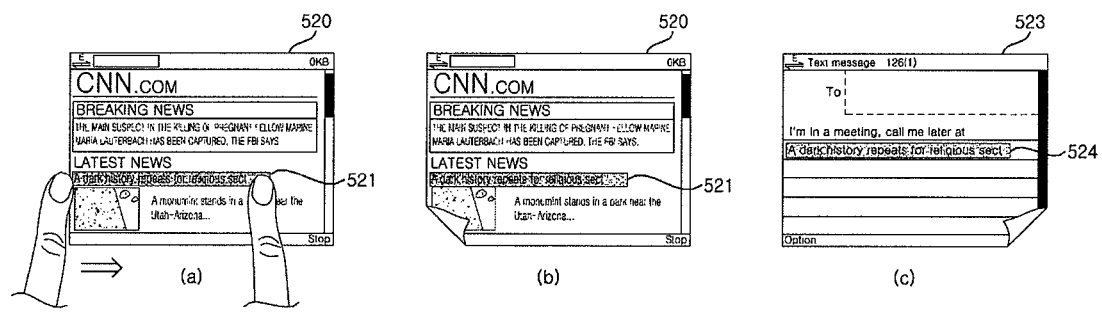

FIG. 10 is example that the controller 180 copies and pastes a data according to a selected area.

Referring to FIG. 10(a), web data 520 or a prescribed text data is displayed on a display region. If a part of the display region of the flexible display 151 is touched and dragged, a text data in the part is assumed to be a selected area 521.

The controller 180 copies a data in the selected area 521 and stores the copied data in the memory 160 according to the bent first part.

The controller 180 copies a data in the selected area and stores the copied data in the memory 160 according to the bent first part.

The copied data is stored in the memory 160 until the mobile terminal turns off. When the mobile terminal turns off, stored data in the memory 160 is deleted. If the controller 180 copies another data, the copied data may be deleted or be stored. If another data is stored, the controller 180 can display a list of stored data.

Referring to FIG. 10(c), a message input window or a data input window 523 is displayed on the display region. If the second part of the flexible display 151 is bent, the controller 180 pastes the stored data in the memory 160 into the message input window or the data input window 523. The controller 180 may paste the stored data on a cursor location 524, and display the stored data on the display region of the flexible display 151.

On the other hand, if the third part of the flexible display 151 is bent, the controller 180 deletes the data in the selected area.

FIG. 11 is example that the controller 180 extends size of a screen according to a bent part of a display region.

Referring to FIG. 11, web data is displayed on a display region. If a part of the display region is bent, the controller 180 extends size of a part of the web data according to the bent part.

If a top and left part of the display region is bent, size of a web data displayed on the top and left part of the display region is extended, as shown in FIG. 11(a). If a bottom and left part of the display region is bent, size of a web data displayed on the bottom and left part of the display region is extended, as shown in FIG. 11(b). As shown in FIGS. 11(c) and 11(d), if a right part of the display region is bent, size of a web data displayed on the right part of the display region is extended.

If a detected bent direction is an opposite direction, the controller 180 reduces size of a part of the web data according to the bent part.

The controller 180 may scroll a screen, change a screen, extend size of a screen or reduce size of a screen according to detected bent part, detected bent area, and detected bent direction.

Figure 12:
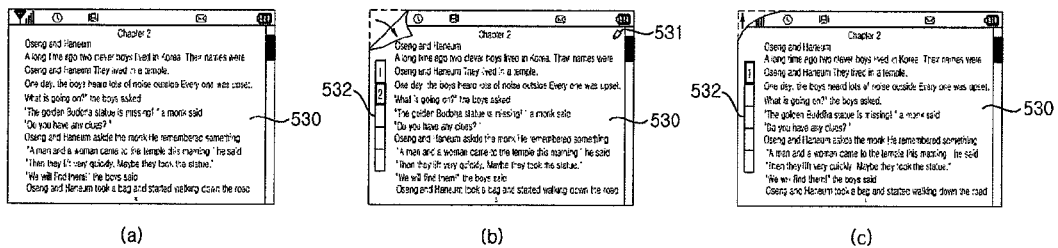
Figure 13:
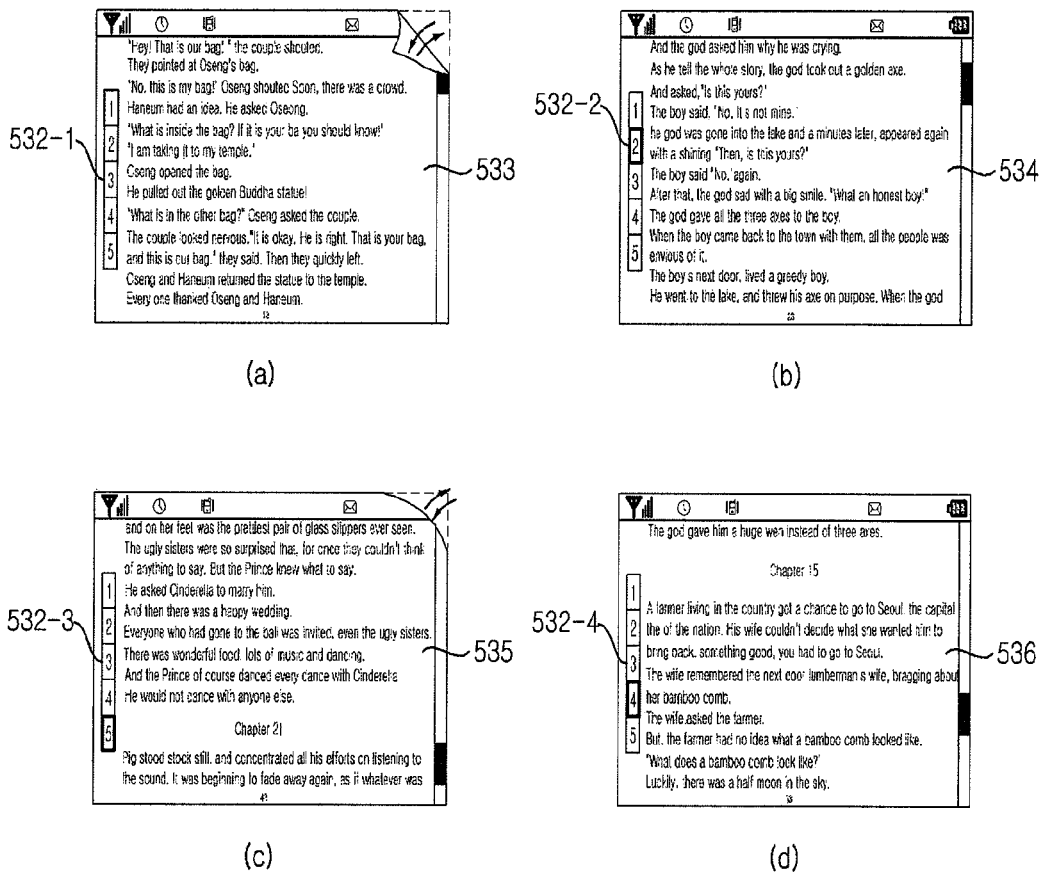

FIGS. 12 through 13 are examples that a page displayed on a display region is bookmarked according to a bent part of a display region.

Referring to FIG. 12(a), a text data 530 is displayed on the display region of the flexible display 151 according to execution of text viewer. A scroll bar is also displayed on the display region according to size of the text data.

If a detected bent direction is the first direction, the controller 180 adds a page displayed on the display region to a bookmark. If a bent elapsed time is more than a prescribed standard time, the controller 180 adds the page displayed on the display region to a bookmark.

And then, a bookmark icon 531 is displayed on a top part of the text data displayed on the display region and a bookmark record 532 is displayed on a part of the display region. The bookmark icon 531 may be displayed only on a page added to a bookmark and the bookmark record 532 may be displayed apart from page. The bookmark record 532 may be displayed or hide according to setting.

If a bookmark is added to a text data, the bookmark record 532 may be added according to the order of page. If added bookmark is more than 6, size of the bookmark record 532 may be changed or one of top, bottom, right and left keys may be displayed on the flexible display 151.

Referring to FIG. 12(c), a page added to a bookmark is displayed on a display region. If the first part of the flexible display 151 is bent to the second direction which is an opposite direction of the first direction, the controller 180 deletes the bookmark. Or if the bent elapsed time is more than a prescribed standard time and the detected bent direction is the second direction, the controller 180 may delete the bookmark.

And then the bookmark displayed on a top part of page would be deleted, the bookmark would be deleted from the bookmark record 532.

Referring to FIG. 13(a), plural pages are added to a bookmark. If the bent elapsed time is less than a prescribed standard time and flexible display 151 is bent one time, the controller 180 calculates a bent elapsed time and a detects bent direction and decides whether an added bookmark exists.

If the added bookmark exists, the controller 180 displays a bookmark page which is added to bookmark according to a detected bent direction. For example, 12 page of the first bookmark is displayed on a display region of the flexible display 151. If flexible display 151 is bent to the first direction one time, referring to FIG. 13(b), 23 page of the second bookmark which is added to a bookmark as number 2 is displayed on the display region.

If the flexible display 151 is bent to the first direction one more time, the controller 180 displays a page of the third bookmark which is the next bookmark on the display region of the flexible display 151.

Referring to FIG. 13(c), if the flexible display 151 is bent to the second direction which is opposite of the first direction and the bent elapsed time is less than a prescribed standard time, the controller 180 displays a screen which is included in a previous added bookmark according to a sensing signal from the sensing unit 140.

For example, 42 page of the fifth bookmark is displayed on a display region. If flexible display 151 is bent to the second direction one time, referring to FIG. 13(d), 33 page of the fourth bookmark which is previous bookmark of the fifth bookmark.

If flexible display 151 is bent to the second direction one time, the third bookmark is displayed on a display region, if flexible display 151 is bent to the second direction one more time, 23 page of the second bookmark is displayed. The controller 180 displays a bookmark of a screen which is displayed on the display region differently from other bookmarks.

Referring to FIGS. 13(a) and 13(b), bookmark record 532-1 which includes the first bookmark displayed differently from other bookmarks changes to bookmark record 532-2 which includes the second bookmark displayed differently from other bookmarks according to changing from page to next page corresponding to a bent part of a display region.

Referring to FIGS. 13(c) and 13(d), bookmark record 532-3 which includes the fifth bookmark displayed differently from other bookmarks changes to bookmark record 532-4 which includes the fourth bookmark displayed differently from other bookmarks according to changing from page to previous page corresponding to a bent part of a display region.

FIGS. 14 through 18 illustrate an executed screen in a music play screen according to a bent part of a display region.

Figure 14:
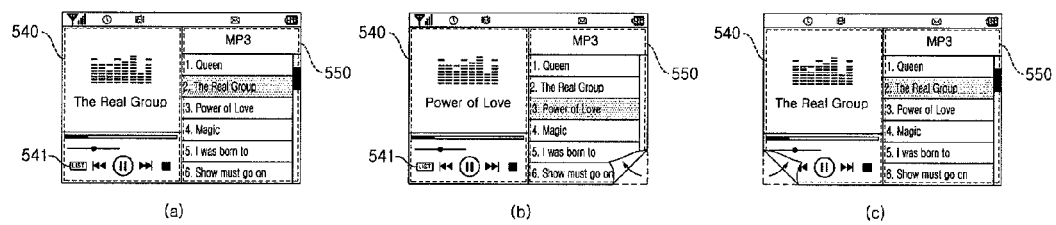
Figure 15:
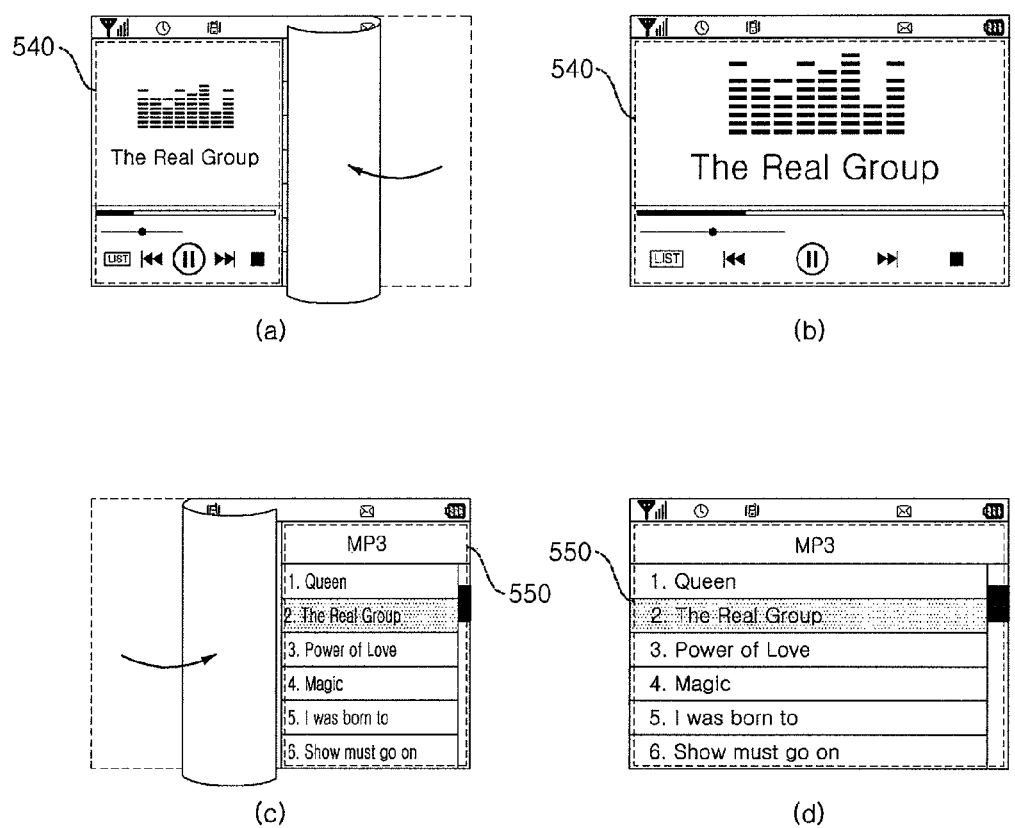
Figure 16:
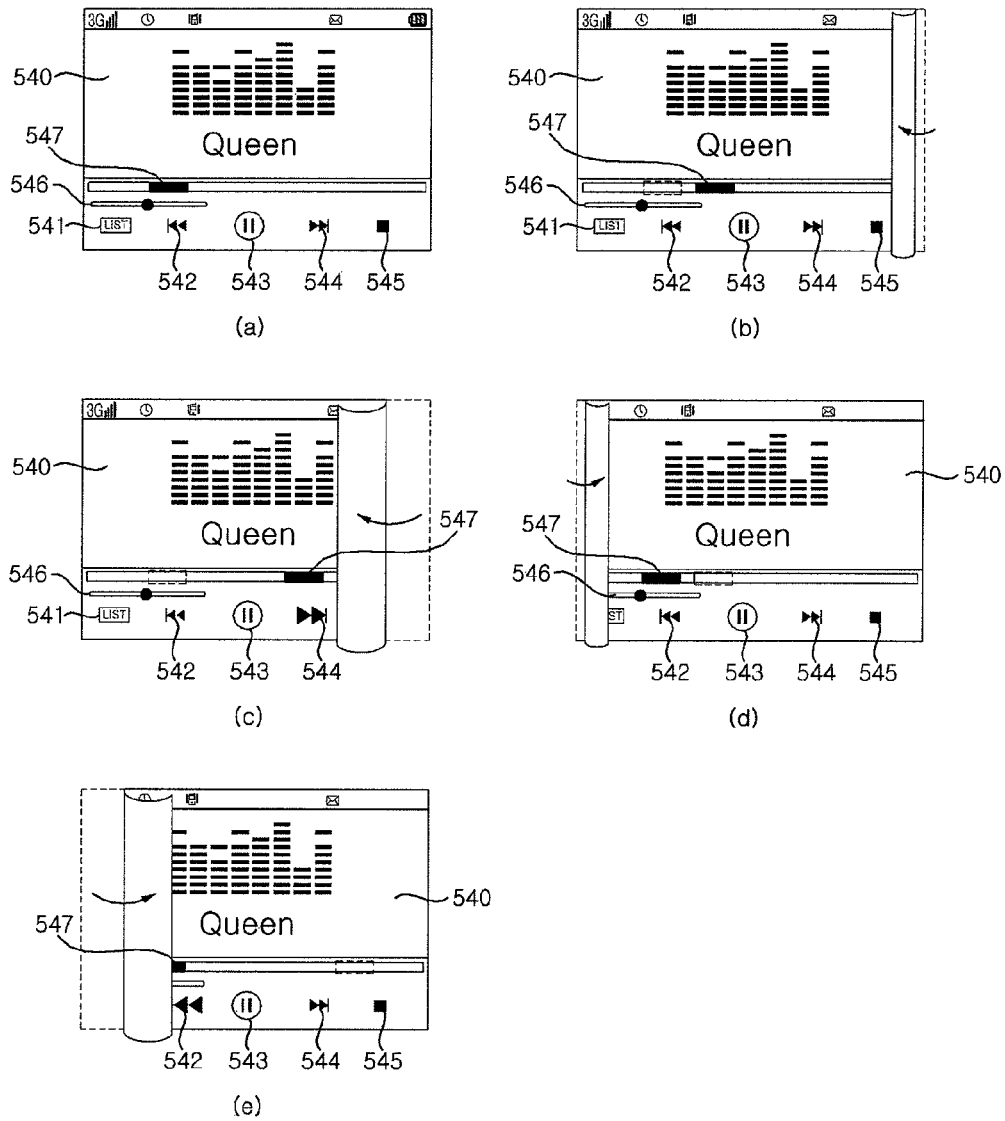

Referring to FIG. 14, when mobile terminal plays music, referring to FIG. 14(a), a music play screen is displayed on a display region of the flexible display 151. The music play screen may include at least one of a play status image 540 and play list 550. The play status image 540 may include image information for played music, play status, volume control, list image, icons or soft keys for FF/REW/stop/pause/play. If the list image is touched, the play list 550 is displayed. If the play list 550 is touched, the play list 550 is deleted on a display region and the play status image 540 is displayed on a display region.

Referring to FIG. 14(b), if the first part of the flexible display 151 is bent during music of the play list 550 is played; the next music of the play list 550 is played. For example, if a bent part of a display region is detected during the second music is played; the controller 180 plays the third music. Played music of the play list 550 is displayed differently from other music.

Referring to FIG. 14(c), if the second part of the flexible display 151 is bent during music of the play list 550 is played; the previous music of the play list 550 is played. For example, if a bent part of a display region is detected during the third music is played; the controller 180 plays the second music.

If the first part of the flexible display 151 is bent to the first direction, the next music will be played, if the first part of the flexible display 151 is bent to the second direction, the previous music will be played. Video file, text file, image file, message can be adapted, so the next file can be executed, played or displayed.

A music play screen is displayed on a display region of the flexible display 151. Referring to 15(a), if a part of the flexible display 151 is bent to horizontal axis, the controller 180 deletes data which is displayed on the bent part and displays data except deleted data on the display region according to the detected bent area.

Referring to 15(b), if a part of the flexible display 151 is bent to horizontal axis, the play list 550 which is displayed on the bent part is deleted and the play status image 540 is displayed on a display region.

Referring to 15(c), if a part of the flexible display 151 is bent to horizontal axis, the play status image 540 which is displayed on the bent part is deleted and only the play list 550 is displayed on a display region according to the detected bent area.

Referring to 16(a), when music is played, the play status image 540 is displayed on the display region of the flexible display 151.

The play status image 540 includes file name or title of the played music, and includes moving image following played music, play status bar (547), volume control bar (546), list image(541), icons or touch file for previous file(542), next file(544), stop(545), pause/play(543).

Referring to 16(b), if a part of the flexible display 151 is bent to the right side, the controller 180 speeds up the played music according to a sensing signal from the sensing unit 140 corresponding to the detected bent area. If the detected bent area is narrow, the controller 180 may speed up the played music for 10 seconds, if the detected bent area is wide, the controller 180 may speed up the played music for 20 seconds according to the detected bent area. For the bent part is detected, speeding up the played music may be continued, time for speeding up the played music depends on the detected bent area.

Referring to 16(c), if the detected bent area is wide, the controller 180 may speed up the played music for a long time.

Referring to 16(d), if a part of the flexible display 151 is bent to the left side, the controller 180 rewinds played music. Time for rewinding the played music depends on the detected bent area. Referring to 16(e), if the detected bent area is wide, the controller 180 may rewind the played music for a long time. For example, if the detected bent area is narrow, the controller 180 may rewind the played music for 10 seconds, if the detected bent area is wide, the controller 180 may rewind the played music for 20 seconds according to the detected bent area. For the bent part is detected, rewinding the played music may be continued.

Location of the play status bar (547) which is displayed may change according to the played music which has been rewinding or speeding up.

The controller 180 can change time for speeding up or rewinding according to a detected bent area, bent angle or bent speed.

Figure 17:
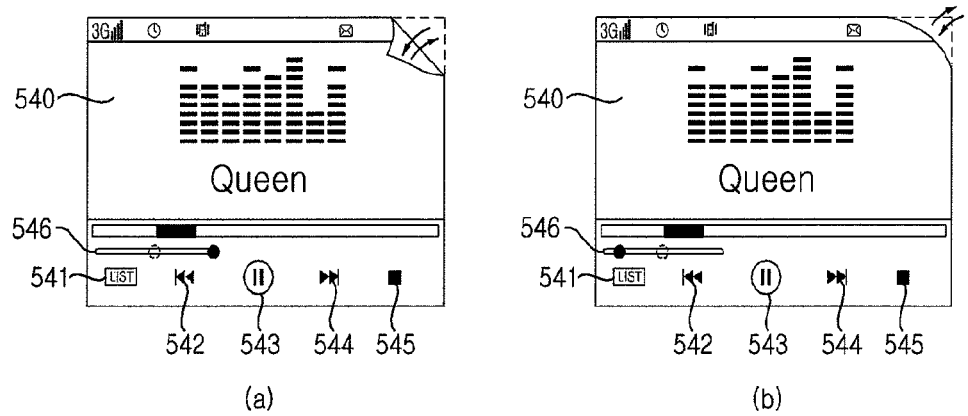
Figure 18:
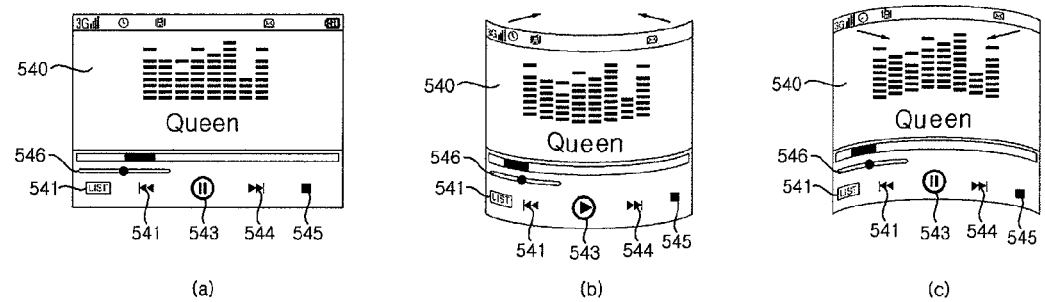

Referring to FIG. 17, if the first part of the flexible display 151 is bent during music is played; referring to FIG. 17(a), volume of the played music is increased. And then, control bar of the volume control bar (546) moves to right. If the second part of the flexible display 151 is bent during music is played; referring to FIG. 17(b), volume of the played music is decreased. And then, control bar of the volume control bar (546) moves to left.

Control bar of the volume control bar (546) can move up and down. The control bar can be displayed various form.

Referring to FIG. 18(a), if a part of the flexible display 151 is bent to the back side during music is played; referring to FIG. 18(b), the controller 180 pauses or stop the played music. When the played music is stopped, the controller 180 changes from pause/play(543) icon to play icon.

If a part of the flexible display 151 is bent to the front side during music is paused or stopped; the controller 180 plays the stopped music. When the stopped music is played, the controller 180 changes from pause/play(543) icon to pause icon.

The controller 180 can play or stop music according to the detected bent part. Video data, text data, image data can be adapted, so these data can be displayed or deleted on the display region according to the detected bent part.

Referring to FIG. 19, mobile terminal runs camera 121 and photographs according to operation of the user input unit 130. Image frames processed by the camera 121 are displayed on a display region.

Mobile terminal is camera mode and image which is an object to photograph is displayed on the flexible display 151. Referring to FIG. 19(b), if a part of the flexible display 151 is bent, the controller 180 makes order to photograph and transmits the order to camera 121, and then camera 121 photographs. Guide message to request user's confirmation whether image data is stored is displays on the flexible display 151.

If the flexible display 151 is touched by user, or order is inputted by operation of the user input unit 130, or a part of the flexible display 151 is bent, photographed image may be stored in the memory 160 or deleted.

Figure 20:
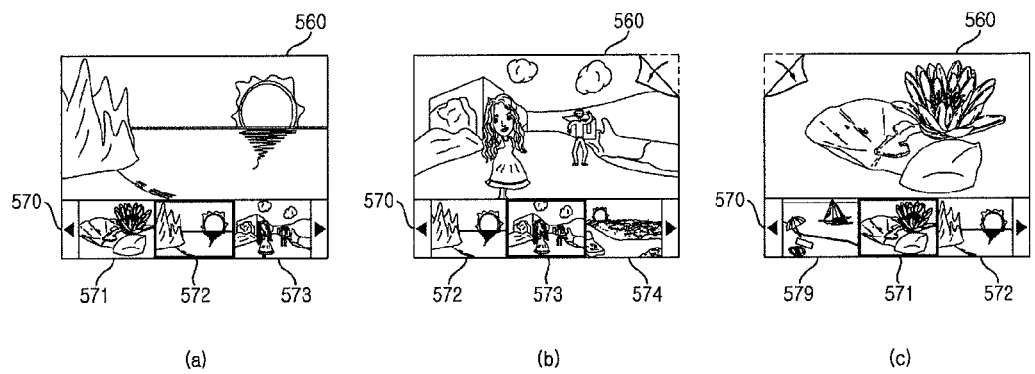
Figure 21:
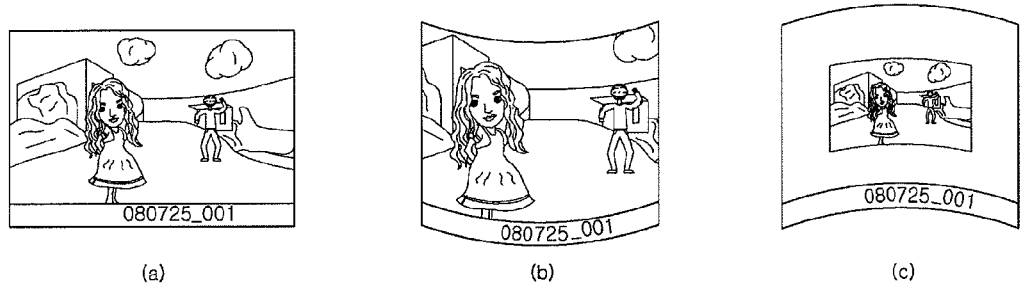
Figure 22:
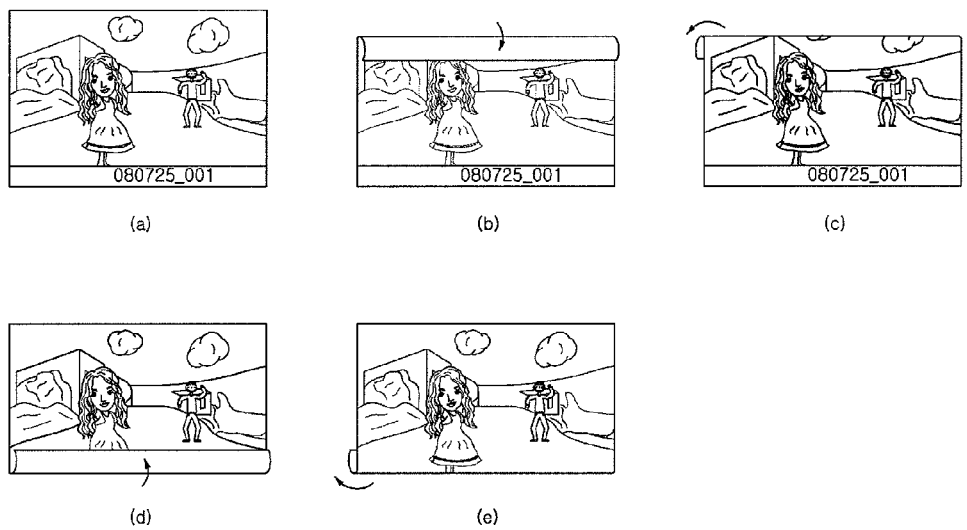
Figure 23:
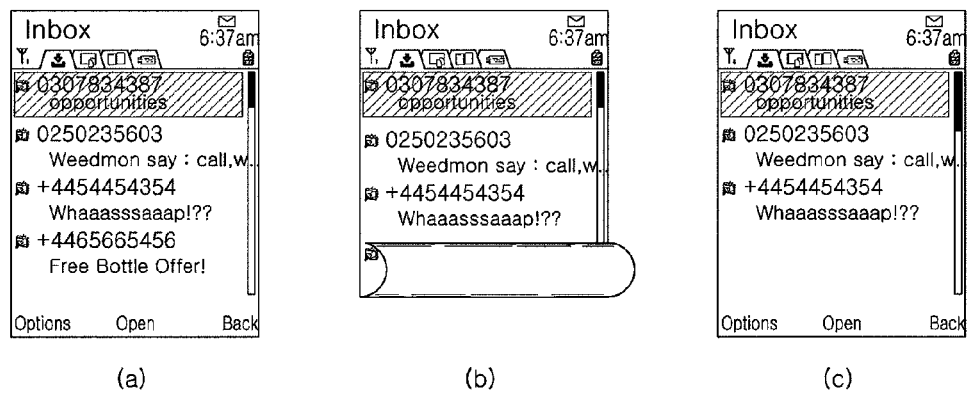

FIGS. 20 through 22 are examples that image data is displayed on a display region of the flexible display.

Referring to FIG. 20, photographed image is stored in the memory 160 and can be found throughout menu such as camera album. If quick view menu is executed in FIG. 19, photographed image is displayed on a display region of the flexible display 151 and user can confirm the photographed image.

Referring to FIG. 20(a), if camera album or quick view menu is executed, photographed image is displayed on a display region of the flexible display 151. At this time, at least one of image display window 560 and image list 570 may be displayed on the display region. The image list 570 is thumbnail of reduced image data. A number of thumbnails on a screen can be changed.

One of the image data included in the image list 570 is displayed on the image display window 560. If one of the image data included in the image list 570 is chosen, chosen image data is displayed on the image display window 560. Thumbnail of the chosen image data displayed on the image display window 560 is displayed on a center of the image list 570. For example, the second image data 572 is displayed on the image display window 560, the second image data 572 is displayed on a center of the image list 570. In other word, the second image data 572 is displayed between the first image data 571 and the third image data 573.

For example, the second image data 572 is displayed on the image display window 560, referring to FIG. 20(b), if the first part of the flexible display 151 is bent, the controller 180 chooses the third image data 573 which is the next image data of the image data included in the image list 570, and displays the third image data 573 on the image display window 560.

And then image data list of the image list 570 is changed and thumbnail of the third image data 573 is displayed on a middle of the image list 570. In other word, the third image data 573 is displayed between the second image data and the fourth image data.

For example, the second image data 572 is displayed on the image display window 560, referring to FIG. 20(c), if the second part of the flexible display 151 is bent, the controller 180 chooses the first image data 571 which is the previous image data of the image data included in the image list 570, and displays the first image data 571 on the image display window 560. And then image data list of the image list 570 is changed and thumbnail of the first image data 571 is displayed on a middle of the image list 570. In other word, the first image data 571 is displayed between the fourth image data 579 and the second image data 572.

Referring to FIG. 21, if camera album or quick view menu is executed, an image data is displayed on a display region of the flexible display 151. Name of the image data or photograph information about the image data can be displayed on the display region.

Referring to FIG. 21(b), if a part of the flexible display 151 is bent to the back side during the image data is displayed, the controller 180 extends size of the image data. Referring to FIG. 21(c), if a part of the flexible display 151 is bent to the front side, the controller 180 reduces size of the image data.

For the bent part is detected, the controller 180 extends or reduces size of the image data continuously according to the detected bent direction. If the flexible display 151 is touched twice or is bent to the first direction, extended image or reduced image is restored. So restored image data is displayed on the display region properly.

Referring to FIG. 22(b), if an upper part of the flexible display 151 is bent to the first direction during the image data is displayed, the controller 180 decreases contrast of the image data. Referring to FIG. 22(a), if the upper part of the flexible display 151 is bent to the second direction during the image data is displayed, the controller 180 increases contrast of the image data.

Referring to FIG. 22(d), if a lower part of the flexible display 151 is bent to the first direction during the image data is displayed, the controller 180 decreases brightness of the image data. Referring to FIG. 22(e), if the lower part of the flexible display 151 is bent to the second direction during the image data is displayed, the controller 180 increases brightness of the image data. For the bent part is detected, the controller 180 changes contrast or brightness of the image data continuously according to the detected bent direction.

Referring to FIG. 23(a), if received message menu is executed, a message list is displayed on a display region of the flexible display 151. A received message, a mail, phone number related to the received message, sub tab to confirm a schedule is displayed, and a received message list is displayed with phone number and a part of the received message.

Referring to FIG. 23(b), if a lower part of the flexible display 151 is bent to the first direction during the received message list is displayed; referring to FIG. 23(c), the controller 180 deletes a part of the received message list which is displayed on the detected bent area.

If a part of the flexible display 151 is bent to the first direction during the received message list is displayed, the controller 180 deletes a data which is displayed on the unseen region on the display region according to the bent part of the display region and the detected bent area. The controller 180 can copy a data displayed on the bent part of the display region and paste the copied data.

Figure 24:
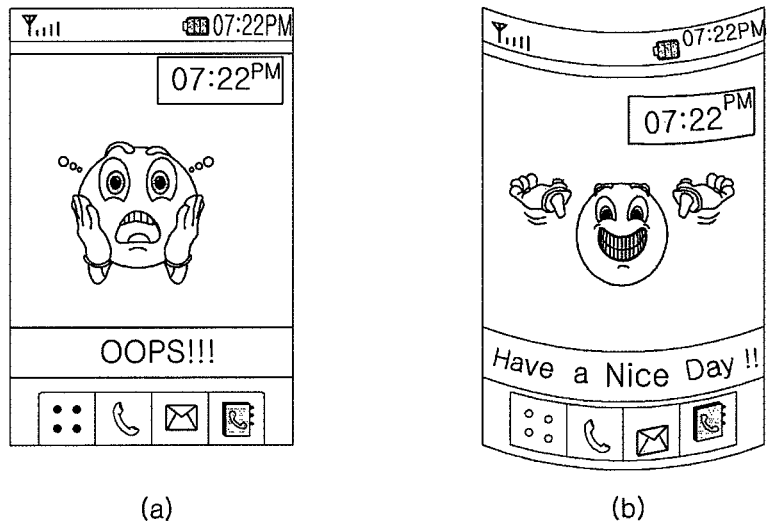

Referring to FIG. 24, when mobile terminal is idle status, an idle screen is displayed on a display region of the flexible display 151. Image, clock shape, text, letter color, and background color which are included on the idle screen can be changed by user's setting, and can be displayed as a theme.

If a part of the flexible display 151 is bent during the idle screen is displayed, the controller 180 changes the idle screen according to the bent part of the display region.

If a theme is displayed, the controller 180 displays the next theme. If a part of the flexible display 151 is bent repeatedly, the controller 180 displays the next theme in regular sequence. As a theme of the idle screen is changed, image, clock shape, text, letter color, and background color which are included on the idle screen are changed.

If a theme is not displayed, the controller 180 changes image data of the idle screen in order of stored image the controller 180 can change a type of displayed language.

Figure 25:
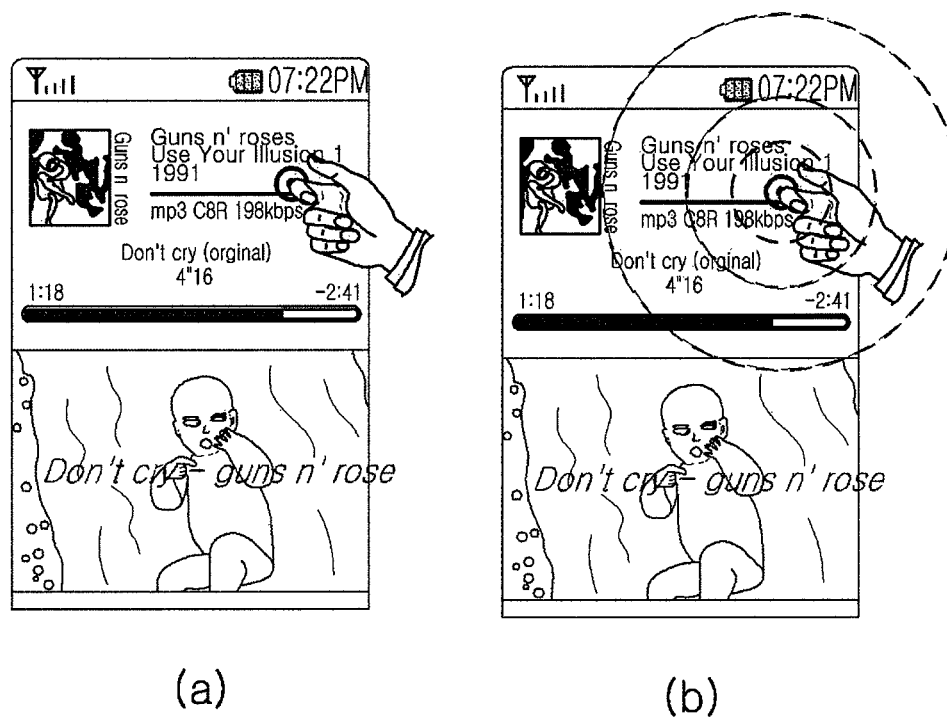

Referring to FIG. 25, if a part of the flexible display 151 is bent during a music play menu or a video is executed, the controller 151 outputs sound or haptic effect corresponding to an image on the flexible display.

If pressure which is inputted is stronger than sensing signal from the sensing unit 140 or if a detected bent area is narrow, the controller 151 may output sound or haptic effect.

For example, if user strikes the flexible display 151 or if user inputs strong pressure with finger to the flexible display 151, the sensing unit 140 may generate a sensing signal according to degree of strength of the sensing signal or range of the sensing signal.

The output unit 150 outputs sound such as a drum audio, a bass drum audio and outputs a haptic effect.

If an upper part or a lower part of the flexible display 151 is bent, a screen which is displayed on the flexible display 151 can be displayed on display region except the detected bent region. For example, the idle screen can be moved and can be displayed on display region except the detected bent region.

The mobile terminal according to the present invention and the controlling method of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal equipped with a flexible display, the method comprising:
    displaying data on a display region of the flexible display;
    dividing the display region into a plurality of parts;
    detecting that a part of the display region of the flexible display is bent;
    selecting one of the divided plurality of parts in response to a location of the bent part;
    enlarging a size of an image of the data displayed in the selected part without changing a size of an image of the data displayed in the unselected parts, if a detected bend direction is a first direction; and
    reducing a size of an image of the data displayed in the selected part without changing a size of an image of the data displayed in the unselected parts, if the detected bend direction is a second direction opposite to the first direction.

2. A mobile terminal, comprising:
    a flexible display configured to display data;
    a sensing unit configured to determine that a part of a display region of the flexible display is bent; and
    a controller configured to
        divide the display region into a plurality of parts,
        select one of the divided plurality of parts in response to a location of the bent part,
        enlarge a size of an image of the data displayed in the selected part without changing a size of an image of the data displayed in the unselected parts, if a detected bend direction is a first direction, and
        reduce a size of an image of the data displayed in the selected part without changing a size of an image of the data displayed in the unselected parts, if the detected bend direction is a second direction opposite to the first direction.

3. A method of controlling a mobile terminal equipped with a flexible display, the method comprising:
    displaying data on a display region of the flexible display, the display region divided into a plurality of divided parts;
    detecting a bend in a predetermined portion of the flexible display; and
    changing a characteristic of data displayed in one part of the plurality of divided parts without changing a characteristic of data displayed in any remaining parts of the plurality of divided parts in response to the detected bend.

4. The method of claim 3, wherein the step of changing comprises:
    enlarging a size of an image displayed in the one part while not changing a size of an image displayed in the remaining parts of the plurality of divided parts if a bend direction of the detected bend is a first direction; and
    reducing the size of the image displayed in the one part while not changing the size of the image displayed in the remaining parts of the plurality of divided parts if the bend direction of the detected bend is a second direction opposite to the first direction.

5. The method of claim 4,
    wherein the step of enlarging a size includes enlarging a font, and
    wherein the step of reducing the size includes reducing the font.

6. The method of claim 3, wherein the step of changing comprises:
    increasing a brightness or a contrast of an image displayed in the one part while not changing a brightness or a contrast of an image displayed in the remaining parts of the plurality of divided parts if a bend direction of the detected bend is a first direction; and
    decreasing the brightness or the contrast of the image displayed in the one part while not changing the brightness or the contrast of the image displayed in the remaining parts of the plurality of divided parts if the bend direction of the detected bend is a second direction opposite to the first direction.

7. The method of claim 3, wherein the step of changing comprises:
    replacing an image displayed in the one part with a next image while not changing an image displayed in the remaining parts of the plurality of divided parts if a bend direction of the detected bend is a first direction; and
    replacing the image displayed in the one part with a previous image while not changing the image displayed in the remaining parts of the plurality of divided parts if the bend direction of the detected bend is a second direction opposite to the first direction.

8. The method of claim 3, wherein the step of changing comprises:
    scrolling an image displayed in the one part in a first direction while not scrolling an image displayed in the remaining parts of the plurality of divided parts if a bend direction of the detected bend is a first direction; and
    scrolling the image displayed in the one part in a second direction opposite to the first direction while not scrolling the image displayed in the remaining parts of the plurality of divided parts if the bend direction of the detected bend is a second direction opposite to the first direction.

9. The method of claim 3, wherein the step of changing comprises:
    bookmarking data displayed in the one part while not bookmarking data displayed in the remaining parts of the plurality of divided parts if a bend direction of the detected bend is a first direction; and
    removing a bookmark of the displayed in the one part while not removing a bookmark of the data displayed in the remaining parts of the plurality of divided parts if the bend direction of the detected bend is a second direction opposite to the first direction.

10. A mobile terminal, comprising:
a flexible display;
a sensing unit configured to determine a bend in a display region of the flexible display; and
a controller operatively connected to the flexible display and the sensing unit, the controller configured to:
display data on the display region of the flexible display, the display region divided into a plurality of divided parts,
detect a bend in a predetermined portion of the flexible display, and
change a characteristic of data displayed in one part of the plurality of divided parts without changing a characteristic of data displayed in any remaining parts of the plurality of divided parts in response to the detected bend.

11. The mobile terminal of claim 10, wherein the controller is configured to:
enlarge a size of an image displayed in the one part while not changing a size of an image displayed in the remaining parts of the plurality of divided parts if a bend direction of the detected bend is a first direction, and
reduce the size of the image displayed in the one part while not changing the size of the image displayed in the remaining parts of the plurality of divided parts if the bend direction of the detected bend is a second direction opposite to the first direction.

12. The mobile terminal of claim 11,
enlarge a size of a font displayed in the one part while not changing a size of a font displayed in the remaining parts of the plurality of divided parts if the bend direction of the detected bend is the first direction, and
reduce the size of the font displayed in the one part while not changing the size of the font displayed in the remaining parts of the plurality of divided parts if the bend direction of the detected bend is the second direction opposite to the first direction.

13. The mobile terminal of claim 10, wherein the controller is configured to:
increase a brightness or a contrast of an image displayed in the one part while not changing a brightness or a contrast of an image displayed in the remaining parts of the plurality of divided parts if a bend direction of the detected bend is a first direction, and
decrease the brightness or the contrast of the image displayed in the one part while not changing the brightness or the contrast of the image displayed in the remaining parts of the plurality of divided parts if the bend direction of the detected bend is a second direction opposite to the first direction.

14. The mobile terminal of claim 10, wherein the controller is configured to:
replace an image displayed in the one part with a next image while not changing an image displayed in the remaining parts of the plurality of divided parts if a bend direction of the detected bend is a first direction, and
replace the image displayed in the one part with a previous image while not changing the image displayed in the remaining parts of the plurality of divided parts if the bend direction of the detected bend is a second direction opposite to the first direction.

15. The mobile terminal of claim 10, wherein the controller is configured to:
scroll an image displayed in the one part in a first direction while not scrolling an image displayed in the remaining parts of the plurality of divided parts if a bend direction of the detected bend is a first direction, and
scroll the image displayed in the one part in a second direction opposite to the first direction while not scrolling the image displayed in the remaining parts of the plurality of divided parts if the bend direction of the detected bend is a second direction opposite to the first direction.

16. The mobile terminal of claim 10, wherein the controller is configured to:
bookmark data displayed in the one part while not bookmarking data displayed in the remaining parts of the plurality of divided parts if a bend direction of the detected bend is a first direction, and
remove a bookmark of the displayed in the one part while not removing a bookmark of the data displayed in the remaining parts of the plurality of divided parts if the bend direction of the detected bend is a second direction opposite to the first direction.

17. A method of controlling a mobile terminal equipped with a flexible display, the method comprising:
displaying data on a display region of the flexible display;
selecting a portion of the data via a user input; and
one of
copying the selected portion in response to detecting a first bend of the flexible display; and
pasting the selected portion in response to detecting a second bend of the flexible display,
wherein the second bend is different than the first bend.

18. The method of claim 17, further comprising:
deleting the selected portion after detecting the first bend of the flexible display.

19. The method of claim 17,
wherein the first bend is a bend of a predetermined portion of the flexible display in a first direction, and
wherein the second bend is a bend of the predetermined portion of the flexible display in a second direction opposite to the first direction.

20. The method of claim 17,
wherein the first bend is a bend in a first predetermined portion of the flexible display, and
wherein the second bend is a bend in a second predetermined portion of the flexible display different from the first predetermined portion.

21. The method of claim 17, wherein the user input is one of a single touch, a multi touch, a swipe and a touch-and-drag.

22. The method of claim 17, wherein the user input is another bend of the flexible display different from the first bend and the second bend.

23. The method of claim 22, wherein the step of selecting the portion of the data via the user input comprises scrolling through the displayed data.

24. A mobile terminal, comprising:
a flexible display;
a sensing unit configured to determine a bend in a display region of the flexible display; and
a controller operatively connected to the flexible display and the sensing unit, the controller configured to:
display data on a display region of the flexible display,
select a portion of the data via a user input, and
one of
copy the selected portion in response to detecting a first bend of the flexible display, and
paste the selected portion in response to detecting a second bend of the flexible display,
wherein the second bend is different than the first bend.

25. The mobile terminal of claim 24, wherein the controller is configured to delete the selected portion after detecting the first bend of the flexible display.

26. The mobile terminal of claim 24,
- wherein the first bend is a bend of a predetermined portion of the flexible display in a first direction, and
- wherein the second bend is a bend of the predetermined portion of the flexible display in a second direction opposite to the first direction.

27. The mobile terminal of claim 24,
- wherein the first bend is a bend in a first predetermined portion of the flexible display, and
- wherein the second bend is a bend in a second predetermined portion of the flexible display different from the first predetermined portion.

28. The mobile terminal of claim 24, wherein the user input is one of a single touch, a multi touch, a swipe and a touch-and-drag.

29. The mobile terminal of claim 24, wherein the user input is another bend of the flexible display different from the first bend and the second bend.

30. The mobile terminal of claim 29, wherein the controller is configured to scroll through the displayed data in response to the user input to select the portion of the data.

* * * * *